United States Patent
Yamaguchi et al.

(10) Patent No.: US 10,710,462 B2
(45) Date of Patent: Jul. 14, 2020

(54) DRIVING DEVICE

(71) Applicant: HONDA MOTOR CO., LTD., Tokyo (JP)

(72) Inventors: Nobutaka Yamaguchi, Saitama (JP); Satoshi Ando, Saitama (JP); Yoshihito Kurizuka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 14 days.

(21) Appl. No.: 16/313,572

(22) PCT Filed: Jun. 30, 2017

(86) PCT No.: PCT/JP2017/024253
§ 371 (c)(1),
(2) Date: Dec. 27, 2018

(87) PCT Pub. No.: WO2018/004003
PCT Pub. Date: Jan. 4, 2018

(65) Prior Publication Data
US 2019/0248247 A1  Aug. 15, 2019

(30) Foreign Application Priority Data

Jun. 30, 2016 (JP) .................. 2016-129789
Jun. 19, 2017 (JP) .................. 2017-119799
Jun. 19, 2017 (JP) .................. 2017-119802

(51) Int. Cl.
*B60K 17/02* (2006.01)
*B60L 15/20* (2006.01)
(Continued)

(52) U.S. Cl.
CPC ............ *B60L 15/2036* (2013.01); *B60K 1/02* (2013.01); *B60K 6/52* (2013.01); *B60K 7/00* (2013.01);
(Continued)

(58) Field of Classification Search
None
See application file for complete search history.

(56) References Cited

U.S. PATENT DOCUMENTS 6,024,182 A * 2/2000 Hamada ................... B60K 1/00
180/6.28
6,321,865 B1 * 11/2001 Kuribayashi .......... B60K 6/383
180/243

(Continued)

FOREIGN PATENT DOCUMENTS

| JP | H06-249302 A | 9/1994 |
| JP | 2010-235051 A | 10/2010 |
| JP | 2012-218563 A | 11/2012 |

OTHER PUBLICATIONS

Jul. 4, 2019, European Search Report issued for related EP application No. 17820357.6.

(Continued)

*Primary Examiner* — Dirk Wright
(74) *Attorney, Agent, or Firm* — Paratus Law Group, PLLC

(57) ABSTRACT

A driving device includes a first one-way clutch OWC1 provided on a power transmission path between a driving source and a driven portion which becomes in an engaged state when rotational power in one direction of the driving source side is input to the driven portion side and becomes in a disengaged state when rotational power in the other direction of the driving source side is input to the driven portion side and which becomes in a disengaged state when rotational power in one direction of the driven portion side is input to the driving source side and becomes in an engaged state when rotational power in the other direction of the driven portion side is input to the driving source side, a connection/disconnection unit which is provided in parallel with the first one-way clutch OWC1 on the power transmis- (Continued)

sion path, and a second one-way clutch OWC2 provided in parallel with the first one-way clutch OWC1 and in series with the connection/disconnection unit on the power transmission path which performs an operation opposite to that of the first one-way clutch OWC1.

23 Claims, 28 Drawing Sheets

(51) Int. Cl.
    *F16H 48/36*     (2012.01)
    *B60K 6/52*     (2007.10)
    *B60K 7/00*     (2006.01)
    *F16H 48/10*     (2012.01)
    *B60L 50/16*     (2019.01)
    *B60K 17/26*     (2006.01)
    *B60K 17/04*     (2006.01)
    *B60K 1/02*     (2006.01)
    *F16D 41/16*     (2006.01)
    *B60K 17/354*     (2006.01)
    *B60K 17/356*     (2006.01)

(52) U.S. Cl.
    CPC ............ *B60K 7/0007* (2013.01); *B60K 17/02* (2013.01); *B60K 17/046* (2013.01); *B60K 17/26* (2013.01); *B60L 50/16* (2019.02); *F16D 41/16* (2013.01); *F16H 48/10* (2013.01); *F16H 48/36* (2013.01); *B60K 17/354* (2013.01); *B60K 17/356* (2013.01); *B60K 2007/0046* (2013.01); *B60K 2007/0092* (2013.01); *B60Y 2200/91* (2013.01); *B60Y 2306/03* (2013.01); *B60Y 2400/427* (2013.01); *Y02T 10/6265* (2013.01); *Y02T 10/646* (2013.01); *Y02T 10/7077* (2013.01)

(56) References Cited

U.S. PATENT DOCUMENTS

| | | | |
|---|---|---|---|
| 8,632,434 B2* | 1/2014 | Kira ................. | B60K 6/442 475/151 |
| 8,905,884 B2* | 12/2014 | Noguchi ............ | B60K 7/0007 475/150 |
| 9,067,485 B2* | 6/2015 | Kira ................. | B60W 10/18 |
| 9,145,961 B2* | 9/2015 | Suzuki ............... | B60K 6/448 |
| 9,150,089 B2* | 10/2015 | Kira ................. | B60W 10/18 |
| 9,174,526 B2* | 11/2015 | Yamamoto .......... | B60L 50/61 |
| 9,193,258 B2* | 11/2015 | Hoshinoya .......... | B60K 11/02 |
| 9,764,644 B2* | 9/2017 | Nishida ............. | B60K 7/0007 |
| 9,945,446 B2* | 4/2018 | Hiramatsu .......... | B60K 6/54 |
| 10,065,527 B2* | 9/2018 | Honda .............. | B60K 17/354 |
| 10,112,602 B2* | 10/2018 | Hiramatsu .......... | F16D 48/06 |
| 10,442,282 B2* | 10/2019 | Shinohara .......... | B60L 15/2009 |
| 2012/0015772 A1 | 1/2012 | Kira et al. | |
| 2013/0165293 A1* | 6/2013 | Shinohara .......... | B60L 50/66 477/3 |
| 2014/0080649 A1 | 3/2014 | Kira et al. | |
| 2014/0080665 A1 | 3/2014 | Kira et al. | |
| 2014/0256493 A1 | 9/2014 | Knoblauch | |

OTHER PUBLICATIONS

Sep. 12, 2017, International Search Report issued for related PCT application No. PCT/JP2017/024253.

Sep. 12, 2017, International Search Opinion issued for related PCT application No. PCT/JP2017/024253.

* cited by examiner

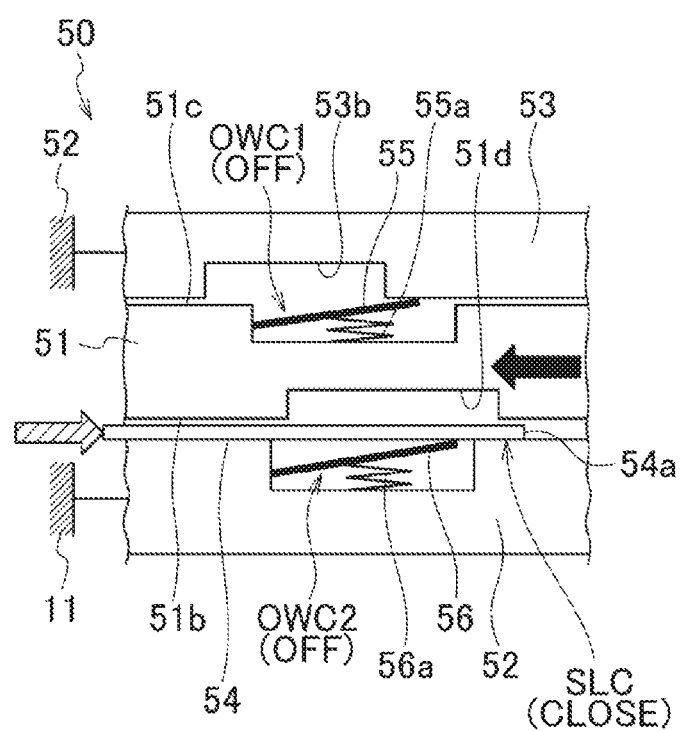

FIG.6

| VEHICLE STATE | FDS | RDS | REAR MOTOR | OWC1 | SLC | OWC2 |
|---|---|---|---|---|---|---|
| VEHICLE STOP(STOP) | STOP | STOP | STOP | OFF | OPEN | OFF |
| REAR-WHEEL DRIVE(RWD) | COAST | DRIVE | POWER-RUNNING DRIVE | ON | OPEN | OFF |
| FRONT-WHEEL DRIVE(FWD)- LOW/MIDDLE VEHICLE SPEED | DRIVE | COAST | STOP | OFF | OPEN | ON |
| FRONT-WHEEL DRIVE(FWD)- HIGH VEHICLE SPEED | DRIVE | COAST | STOP | OFF | CLOSE | OFF |
| DECELERATION REGENERATION(REG) | COAST | COAST | REGENERATIVE DRIVE | OFF | OPEN | ON |
| REARWARD TRAVELLING(REV) | STOP | DRIVE | REVERSE POWER-RUNNING DRIVE | OFF | OPEN | ON |

DRIVING DEVICE

CROSS REFERENCE TO PRIOR APPLICATION

This application is a National Stage Patent Application of PCT International Patent Application No. PCT/JP2017/024253 (filed on Jun. 30, 2017) under 35 U.S.C. § 371, which claims priority to Japanese Patent Application Nos. 2016-129789 (filed on Jun. 30, 2016), 2017-119799 (filed on Jun. 19, 2017), and 2017-119802 (filed on Jun. 19, 2017), which are all hereby incorporated by reference in their entirety.

TECHNICAL FIELD

The present invention relates to a driving device provided in a transport apparatus such as a vehicle.

BACKGROUND ART

Patent Literature 1 discloses a driving device for a vehicle including a left wheel driving device which has a first electric motor for driving a left wheel of a vehicle and a first planetary-gear-type transmission disposed on a power transmission path between the first electric motor and the left wheel and a right wheel driving device which has a second electric motor for driving a right wheel of the vehicle and a second planetary-gear-type transmission disposed on a power transmission path between the second electric motor and the right wheel. In the first and second planetary-gear-type transmissions, the first and second electric motors are respectively connected to sun gears and the left wheel and the right wheel are respectively connected to planetary carriers, and further, ring gears are connected to each other. On the ring gears connected to each other, a brake unit for braking the rotation of the ring gear by releasing or engaging the ring gear and a one-way clutch which becomes in an engaged state when rotational power in one direction of the electric motor side is input to the wheel side and becomes in a disengaged state when rotational power in the other direction of the electric motor side is input to the wheel side and which becomes in a disengaged state when rotational power in one direction of the wheel side is input to the electric motor side and becomes in an engaged state when rotational power in the other direction of the wheel side is input to the electric motor side are provided.

PRIOR ART LITERATURE

Patent Literature

Patent Literature 1: JP-A-2010-235051

SUMMARY OF THE INVENTION

Problem that the Invention is to Solve

However, in the driving device disclosed in Patent Literature 1, in order to brake the rotation of the ring gear, it is necessary to maintain the brake unit (hydraulic brake) in the engaged state during rearward travelling by reverse power-running driving of the first and second electric motors, and decelerating regenerative travelling (forward travelling) in which the first and second electric motors are regeneratively driven.

The invention provides a driving device capable of reducing energy loss during rearward travelling or decelerating regenerative travelling.

Means for Solving the Problem

The invention provides the following aspects.
A first aspect defines a driving device including:
a driving source (for example, a first electric motor 2A, a second electric motor 2B, and an electric motor 2 in the embodiments described below);
a driven portion (for example, a rear wheel Wr in the embodiments described below) which is driven by the driving source and propels a transport apparatus (for example, a vehicle V in the embodiments described below);
a first one-way power transmission unit (for example, a first one-way clutch OWC1 in the embodiments described below) which is provided on a power transmission path between the driving source and the driven portion, which becomes in an engaged state when rotational power in one direction of the driving source side is input to the driven portion side and becomes in a disengaged state when rotational power in the other direction of the driving source side is input to the driven portion side, and which becomes in a disengaged state when rotational power in one direction of the driven portion side is input to the driving source side and becomes in an engaged state when rotational power in the other direction of the driven portion side is input to the driving source side;
a connection/disconnection unit (for example, a switching unit SLC in the embodiments described below) which is provided in parallel with the first power transmission unit on the power transmission path, and which sets the power transmission path to an interrupted state or a connection-permitted state by being activated or deactivated; and
a second one-way power transmission unit (for example, a second one-way clutch OWC2 in the embodiments described below) which is provided in parallel with the first one-way power transmission unit and in series with the connection/disconnection unit on the power transmission path, which becomes in a disengaged state when rotational power in one direction of the driving source side is input to the driven portion side and becomes in an engaged state when rotational power in the other direction of the driving source side is input to the driven portion side, and which becomes in an engaged state when rotational power in one direction of the driven portion side is input to the driving source side and becomes in a disengaged state when rotational power in the other direction of the driven portion side is input to the driving source side.

A second aspect defines, based on the first aspect, the driving device, wherein:
the driving source includes a first electric motor (for example, a first electric motor 2A in the embodiments described below) for driving a left wheel (for example, a left rear wheel LWr in the embodiments described below) of a vehicle (for example, a vehicle V in the embodiments described below) and a second electric motor (for example, a second electric motor 2B in the embodiments described below) for driving a right wheel (for example, a right rear wheel RWr in the embodiments described below) of the vehicle;

a first transmission (for example, a first planetary-gear-type speed reducer 12A in the embodiments described below) is provided on a power transmission path between the first electric motor and the left wheel;

a second transmission (for example, a second planetary-gear-type speed reducer 12B in the embodiments described below) is provided on a power transmission path between the second electric motor and the right wheel;

each of the first and second transmissions is constituted by first to third rotation elements (for example, sun gears 21A and 21B, planetary carriers 23A and 23B, and ring gears 24A and 24B in the embodiments described below);

the first electric motor is connected to the first rotation element of the first transmission;

the second electric motor is connected to the first rotation element of the second transmission;

the left wheel is connected to the second rotation element of the first transmission;

the right wheel is connected to the second rotation element of the second transmission;

the third rotation element of the first transmission and the third rotation element of the second transmission are connected to each other; and the first one-way power transmission unit, the connection/disconnection unit, and the second one-way power transmission unit are arranged in the third rotation elements connected to each other.

A third aspect defines, based on the second aspect, the driving device, wherein:

the first electric motor and the first transmission are arranged in this order from a left outer side in a vehicle width direction;

the second electric motor and the second transmission are arranged in this order from a right outer side in the vehicle width direction; and the first one-way power transmission unit, the connection/disconnection unit, and the second one-way power transmission unit are arranged between the first transmission and the second transmission in the vehicle width direction.

A fourth aspect defines, based on the second or third aspect, the driving device, wherein:

the first one-way power transmission unit, the connection/disconnection unit, and the second one-way power transmission unit a arranged further on an inner side than outermost diameter portions (for example, outermost diameter portions R1 in the embodiments described below) of the first transmission and the second transmission in a radial direction.

A fifth aspect defines, based on the second aspect, the driving device, wherein:

the first electric motor and the first transmission are arranged in this order from a left outer side in a vehicle width direction;

the second electric motor and the second transmission are arranged in this order from a right outer side in the vehicle width direction; and the first one-way power transmission unit, the connection/disconnection unit, and the second one-way power transmission unit are arranged on either one side of the first transmission or the second transmission in the vehicle width direction and on a radially outer side.

A sixth aspect defines, based on the fifth aspect, the driving device, wherein:

the driving device includes an actuator (for example, an actuator 58 in the embodiments described below) for controlling activation or deactivation of the connection/disconnection unit; and the actuator is arranged on the other side of the first transmission and the second transmission in the vehicle width direction and on a radially outer side.

A seventh aspect defines, based on the sixth aspect, the driving device, wherein:

at least a part of the actuator is arranged further on an inner side than an outermost diameter portion (for example, the outermost diameter portion R1 of the embodiments described below) of the first transmission or the second transmission in the radial direction.

An eighth aspect defines a driving device including:

a driving source (for example, the first electric motor 2A, the second electric motor 2B, and the electric motor 2 in the embodiments described below);

a driven portion (for example, the rear wheel Wr in the embodiments described below) which is driven by the driving source and propels a transport apparatus (for example, the vehicle V in the embodiments described below);

a first one-way power transmission unit (for example, the first one-way clutch OWC1 in the embodiments described below) which is provided on a power transmission path between the driving source and the driven portion, which becomes in an engaged state when rotational power in one direction of the driving source side is input to the driven portion side and becomes in a disengaged state when rotational power in the other direction of the driving source side is input to the driven portion side, and which becomes in a disengaged state when rotational power in one direction of the driven portion side is input to the driving source side and becomes in an engaged state when rotational power in the other direction of the driven portion side is input to the driving source side;

a second one-way power transmission unit (for example, a second one-way clutch OWC2 in the embodiments described below) which is provided in parallel with the first one-way power transmission unit on the power transmission path, which becomes in a disengaged state when rotational power in one direction of the driving source side is input to the driven portion side and becomes in an engaged state when rotational power in the other direction of the driving source side is input to the driven portion side, and which becomes in an engaged state when rotational power in one direction of the driven portion side is input to the driving source side and becomes in a disengaged state when rotational power in the other direction of the driven portion side is input to the driving source side; and a switching unit (for example, the switching unit SLC in the embodiments described below) which is provided in parallel with the first one-way power transmission unit and in series with the second one-way power transmission unit on the power transmission path and sets the second one-way power transmission unit to an effective state or an ineffective state by being switched between a first state (for example, a deactivated state in the embodiments described below) and a second state (for example, an activated state in the embodiments described below).

A ninth aspect defines, based on the eighth aspect, the driving device, wherein:

the driving source includes a first electric motor (for example, the first electric motor 2A in the embodiments described below) driving a left wheel (for example, the left rear wheel LWr in the embodiments described below) of a vehicle (for example, a vehicle V in the embodiments described below) and a second electric motor (for example, the second electric motor 2B in the embodiments described below) driving a right wheel (for example, the right rear wheel RWr in the embodiments described below) of the vehicle;

a first transmission (for example, the first planetary-gear-type speed reducer 12A in the embodiments described below) is provided on a power transmission path between the first electric motor and the left wheel;

a second transmission (for example, the second planetary-gear-type speed reducer 12B in the embodiments described below is provided on a power transmission path between the second electric motor and the right wheel;

each of the first and second transmissions is constituted by first to third rotation elements (for example, the sun gears 21A and 21B, the planetary carriers 23A and 23B, and the ring gears 24A and 24B in the embodiments described below);

the first electric motor is connected to the first rotation element of the first transmission;

the second electric motor is connected to the first rotation element of the second transmission;

the left wheel is connected to the second rotation element of the first transmission;

the right wheel is connected to the second rotation element of the second transmission;

the third rotation element of the first transmission and the third rotation element of the second transmission are connected to each other; and the first one-way power transmission unit, the second one-way power transmission unit, and the switching unit are arranged in the third rotation elements connected to each other.

A tenth aspect defines, based on the ninth aspect, the driving device, wherein:

the first electric motor and the first transmission are arranged in this order from a left outer side in a vehicle width direction;

the second electric motor and the second transmission are arranged in this order from a right outer side in the vehicle width direction; and the first one-way power transmission unit, the second one-way power transmission unit, and the switching unit are arranged between the first transmission and the second transmission in the vehicle width direction.

An eleventh aspect defines, based on the ninth or tenth aspect, the driving device, wherein:

the first one-way power transmission unit, the second one-way power transmission unit, and the switching unit are arranged further on an inner side than outermost diameter portions of the first transmission and the second transmission in a radial direction.

A twelfth aspect defines, based on the ninth aspect, the driving device, wherein:

the first electric motor and the first transmission are arranged in this order from a left outer side in a vehicle width direction;

the second electric motor and the second transmission are arranged in this order from a right outer side in the vehicle width direction; and the first one-way power transmission unit, the second one-way power transmission unit, and the switching unit are arranged on either one side of the first transmission or the second transmission in the vehicle width direction and on a radially outer side.

The thirteenth aspect defines, based on the twelfth aspect, the driving device, wherein:

the driving device includes an actuator for controlling the first state or the second state of the switching unit; and the actuator is arranged on the other side of the first transmission and the second transmission in the vehicle width direction and on the radially outer side.

A fourteenth aspect defines, based on the thirteenth aspect, the driving device, wherein:

at least a part of the actuator is arranged further on an inner side than an outermost diameter portion of the first transmission or the second transmission in the radial direction.

A fifteenth aspect defines a driving device (for example, a rear-wheel driving device 1 in the embodiments described below), which includes a driving source (for example, the first electric motor 2A and the second electric motor 2B in the embodiments described below) and a wheel portion (for example, the rear wheel Wr in the embodiments described below) driven by the driving source, wherein the driving device includes a first one-way power transmission unit (for example, the first one-way clutch OWC1 in the embodiments described below) which is provided on a power transmission path between the driving source and the wheel, which becomes in an engaged state when rotational power in one direction of the driving source side is input to the wheel side, and which becomes in a disengaged state when rotational power in the other direction of the driving source side is input to the wheel side and which becomes in a disengaged state when rotational power in one direction of the wheel side is input to the driving source side and becomes in an engaged state when rotational power in the other direction of the wheel side is input to the driving source side;

a second one-way power transmission unit (for example, the second one-way clutch OWC2 in the embodiments described below) which is provided in parallel with the first one-way power transmission unit on the power transmission path, which becomes in a disengaged state when rotational power in one direction of the driving source side is input to the wheel side and becomes in an engaged state when rotational power in the other direction of the driving source side is input to the wheel side, and which becomes in an engaged state when rotational power in one direction of the wheel side is input to the driving source side and becomes in a disengaged state when rotational power in the other direction of the wheel side is input to the driving source side; and a switching unit (for example, the switching unit SLC in the embodiments described below) which is provided in parallel with the first one-way power transmission unit and in series with the second one-way power transmission unit on the power transmission path, and which sets the second one-way power transmission unit to an effective state or an ineffective state by being switched between a first state and a second state, wherein the driving source includes a left electric motor (for example, the first electric motor 2A in the embodiments described below) driving a left wheel (for example, the left rear wheel LWr in the embodiments described below) of a vehicle (for example, the vehicle V in the embodiments described below) and a right electric motor (for example, the second electric motor 2B in the embodiments described below) driving a right wheel (for example, the right rear wheel RWr in the embodiments described below) of the vehicle, a left transmission (for example, the first planetary-gear-type speed reducer 12A in the embodiments described below) is provided on a power transmission path between the left electric motor and the left wheel, a right transmission (for example, the second planetary-gear-type speed reducer 12B in the embodiments described below) is provided on a power transmission path between the right electric motor and the right wheel, each of the left transmission and the right transmission has a sun rotating body (for example, the sun gears 21A and 21B in the embodiments described below), a ring rotating body (for example, the ring gears 24A and 24B in the embodiments described below), a planetary rotating body (for example, the planetary gears 22A and 22B in the embodiments described below) meshing with the sun rotating body and the ring rotating body, and a carrier rotating body (for example, the planetary carriers 23A and 23B in the embodiments described below) which supports the planetary rotating body in a rotatable and revolvable manner, the left electric motor is connected to the sun rotating body of the left transmission, the right electric motor is connected to the sun rotating body of the right transmission, the left wheel is connected to the carrier rotating body of the left transmission, the right wheel is connected to the carrier rotating body of the right transmission, the ring rotating body of the left transmission and the ring rotating body of the right transmission are connected to each other, the first one-way power transmission unit, the second one-way power transmission unit, and the switching unit are arranged in the ring rotating bodies connected to each other, in the ring rotating body of the left transmission, an inward flange portion (for example, an inward flange portion 37A in the embodiments described below) extending inward in a radial direction is supported by the carrier rotating body of the left transmission, in the ring rotating body of the right transmission, an inward flange portion (for example, an inward flange portion 37B in the embodiments described below) extending inward in the radial direction is supported by the carrier rotating body of the right transmission, and an abutment position where the ring rotating body of the left transmission and the ring rotating body of the right transmission directly or indirectly abut on each other is located at the substantially same diameter position as a meshing position between the ring rotating body of the left transmission and the planetary rotating body of the left transmission and a meshing position between the ring rotating body of the right transmission and the planetary rotating body of the right transmission.

A sixteenth aspect defines, based on the fifteenth aspect, the driving device, wherein:

a meshing portion between the ring rotating body of the left transmission and the planetary rotating body of the left transmission is formed such that a force acts on the ring rotating body of the left transmission in a direction approaching the right transmission in an axial direction when rotational power in one direction of the driving source side is input to the wheel side; and a meshing portion between the ring rotating body of the right transmission and the planetary rotating body of the right transmission is formed such that a force acts on the ring rotating body of the right transmission in a direction approaching the left transmission in the axial direction when rotational power in one direction of the driving source side is input to the wheel side.

A seventeenth aspect defines, based on the sixteenth aspect, the driving device, wherein:

the rotational power in one direction of the driving source side is rotational power at the time of advancing the vehicle.

An eighteenth aspect defines, based on any one of the fifteenth to seventeenth aspects, the driving device, wherein:

the left electric motor and the left transmission are arranged in this order from a left outer side in a vehicle width direction;

the right electric motor and the right transmission are arranged in this order from a right outer side in the vehicle width direction; and the first one-way power transmission unit, the second one-way power transmission, and the switching unit are arranged on either one side of the left transmission or the right transmission in the vehicle width direction and on a radially outer side.

A nineteenth aspect defines a driving device (for example, a rear-wheel driving device 1 in the embodiments described below) which includes a driving source (for example, the first electric motor 2A and the second electric motor 2B in the embodiments described below) and a wheel (for example, the rear wheel Wr in the embodiments described below) driven by the driving source, wherein the driving device includes a first one-way power transmission unit (for example, the first one-way clutch OWC1 in the embodiments described below) which is provided on a power transmission path between the driving source and the wheel, which becomes in an engaged state when rotational power in one direction of the driving source side is input to the wheel side and becomes in a disengaged state when rotational power in the other direction of the driving source side is input to the wheel side, and which becomes in a disengaged state when rotational power in one direction of the wheel side is input to the driving source side and becomes in an engaged state when rotational power in the other direction of the wheel side is input to the driving source side;

a second one-way power transmission unit (for example, the second one-way clutch OWC2 in the embodiments described below) which is provided in parallel with the first one-way power transmission unit on the power transmission path, which becomes in a disengaged state when rotational power in one direction of the driving source side is input to the wheel side and becomes in an engaged state when rotational power in the other direction of the driving source side is input to the wheel side, and which becomes in an engaged state when rotational power in one direction of the wheel side is input to the driving source side and becomes in a disengaged state when rotational power in the other direction of the wheel side is input to the driving source side; and a switching unit example, the switching unit SLC in the embodiments described below) which is provided in parallel with the first one-way power transmission unit and in series with the second one-way power transmission unit on the power transmission path and sets the second one-way power transmission unit to an effective state or an ineffective state by being switched between a first state and a second state, wherein the driving source includes a left electric motor (for example, the first electric motor 2A in the embodiments described below) driving a left wheel (for example, the left rear wheel LWr in the embodiments described below) of a vehicle (for example, the vehicle V in the embodiments described below) and a right electric motor (for example, the second electric motor 2B in the embodiments described below) driving a right wheel (for example, the right rear wheel RWr in the embodiments described below) of the vehicle, a left transmission (for example, the first planetary-gear-type speed reducer 12A in the embodiments described below) is provided on a power transmission path between the left electric motor and the left wheel, a right transmission (for example, the second planetary-gear-type speed reducer 12B in the embodiments described below) is provided on a power transmission path between the right electric motor and the right wheel, each of the left transmission and the right transmission has a sun rotating body (for example, the sun gears 21A and 21B in the embodiments described below), a ring rotating body (for example, the ring gears 24A and 24B in the embodiments described below), a planetary rotating body (for example, the planetary gears 22A and 22B in the embodiments described below) meshing with the sun rotating body and the ring rotating body, and a carrier rotating body (for example, the planetary carriers 23A and 23B in the embodiments described below) which supports the planetary rotating body in a rotatable and revolvable manner, the left electric motor is connected to the sun rotating body of the left transmission, the right electric motor is connected to the sun rotating body of the right transmission, the left wheel is connected to the carrier rotating body of the left transmission, the right wheel is connected to the carrier rotating body of the right transmission, the ring rotating body of the left transmission and the ring rotating body of the right transmission are connected to each other via a connecting member fitted from an outer diameter side, the first one-way power transmission unit, the second one-way power transmission unit, and the switching unit are arranged in the ring rotating bodies connected to each other, an oil reservoir (for example, an oil reservoir 61 in the embodiments described below) for storing lubricating oil is provided above the connecting member, and the connecting member is provided with a through hole (for example, a through hole 72 in the embodiments described below) passing through an inner circumferential surface and the outer circumferential surface.

A twentieth aspect defines, based on the nineteenth aspect, the driving device, wherein:

a ring spline portion (for example, a spline 36A in the embodiments described below) is provided on an outer circumferential surface of the ring rotating body of the left transmission;

a ring spline portion (for example, a spline 36b in the embodiments described below) is provided on an outer circumferential surface of the ring rotating body of the right transmission;

in the connecting member, a connecting spline portion (for example, a connecting spline portion 70 in the embodiments described below) fitted to the ring spline portions of the ring rotating bodies of the left transmission and the right transmission is provided on the inner circumferential surface; and the through hole is disposed between the ring spline portion provided in the ring rotating body of the left transmission and the ring spline portion provided in the ring rotating body of the right transmission.

A twenty-first aspect defines, based on the twentieth aspect, the driving device, wherein:

the connecting spline portion has a left connecting spline portion (for example, a left connecting spline portion 70A in the embodiments described below) fitted to the ring spline portion provided in the ring rotating body of the left transmission, a right connecting spline portion (for example, a right connecting spline portion 70B in the embodiments described below) fitted to the ring spline portion provided in the ring rotating body of the right transmission, and an annular groove (for example, an annular groove 71 in the embodiments described below) accommodating a circlip (a circlip 43 in the embodiments described below) disposed between the left connecting spline portion and the right connecting spline portion; and the through hole is provided in the annular groove.

A twenty-second aspect defines, based on the twenty-first aspect, the driving device, wherein:

a predetermined gap (for example, a gap 73 in the embodiments described below) is provided in a radial direction between the circlip and the through hole.

A twenty-third aspect defines, based on the twenty-first or twenty-second aspect, the driving device, wherein:

a plurality of the through holes are provided in a circumferential direction; and a recessed groove (for example, a recessed groove 74 in the embodiments described below) connecting the plurality of the through holes is provided on the outer circumferential surface of the connecting member.

A twenty-fourth aspect defines, based on any one of the nineteenth to twenty-third aspects, the driving device, wherein:

an abutment position where the ring rotating body of the left transmission and the ring rotating body of the right transmission directly or indirectly abut on each other is located at the substantially same diameter position as a meshing position between the ring rotating body of the left transmission and the planetary rotating body of the left transmission and a meshing position between the ring rotating body of the right transmission and the planetary rotating body of the right transmission.

A twenty-fifth aspect defines, based on any one of the nineteenth to twenty-fourth aspects, the driving device, wherein:

the driving device further includes an actuator (for example, the actuator 58 in the embodiments described below) for controlling an effective state or an ineffective state of the switching unit;

the first one-way power transmission unit, the switching unit, and the second one-way power transmission unit are arranged on either one side of the ring rotating bodies connected to each other and on an outer diameter side;

the actuator is disposed on the other side of the ring rotating bodies connected to each other and on the outer diameter side; and the oil reservoir is integrally formed with an actuator holding portion (for example, an actuator holding portion 60 in the embodiments described below) for holding the actuator.

Advantageous Effects of the Invention

According to the first aspect, the second one-way power transmission unit capable of mechanically transmitting the rotational power in the other direction of the driving source side to the driven portion side is provided. Therefore, it is possible to reduce the fastening energy of a brake unit, which is necessary in the related art when (for example, during rearward travelling) the rotational power in the other direction of the driving source side is transmitted to the driven portion side. Further, the second one-way power transmission unit can mechanically transmit the rotational power in one direction of the driven portion side to the driving source side, and thus it is possible to reduce the fastening energy of the brake unit, which is necessary in the related art when (for example, during decelerating regenerative travelling) the rotational power in one direction of the driven portion side is transmitted to the driving source side. In the power transmission path in which the second one-way power transmission unit is provided, the connection/disconnection unit for bringing the power transmission path into the interrupted state or the connection-permitted state is provided in series. Therefore, in a situation (for example, during the forward high-speed travelling) in which it is undesirable to transmit the rotational power in one direction of the driven portion side to the driving source side, mechanical power transmission by the second one-way power transmission unit can be interrupted.

According to the second aspect, the first one-way power transmission unit, the connection/disconnection unit, and the second one-way power transmission unit are disposed in the mutually connected third rotation elements of the first transmission and the second transmission. Thus, the speed change states of the first transmission and the second transmission can be controlled by a group of the first one-way power transmission unit, the connection/disconnection unit, and the second one-way power transmission unit.

According to the third aspect, the first one-way power transmission unit, the connection/disconnection unit, and the second one-way power transmission unit are disposed between the first transmission and the second transmission in the vehicle width direction. Therefore, it is possible to suppress an increase in the size in the radial direction due to the arrangement of the first one-way power transmission unit, the connection/disconnection unit, and the second one-way power transmission unit.

According to the fourth aspect, the first one-way power transmission unit, the connection/disconnection unit, and the second one-way power transmission unit are arranged further on an inner side than the outermost diameter portions of the first transmission and the second transmission in the radial direction. Therefore, it is possible to reliably suppress an increase in the size in the radial direction due to the arrangement of the first one-way power transmission unit, the connection/disconnection unit, and the second one-way power transmission unit.

According to the fifth aspect, the first one-way power transmission unit, the connection/disconnection unit, and the second one-way power transmission unit are arranged on either one side of the first transmission or the second transmission in the vehicle width direction and on the radially outer side, and thus it is possible to suppress an increase in the size in the vehicle width direction due to the arrangement of the first one-way power transmission unit, the connection/disconnection unit, and the second one-way power transmission unit.

According to the sixth aspect, since the actuator for controlling activation or deactivation of the connection/disconnection unit is disposed on the other side of the first transmission and the second transmission in the vehicle width direction and on the outer side in the radial direction, it is possible to suppress an increase in the size in the vehicle width direction due to the arrangement of the actuator.

According to the seventh aspect, at least a part of the actuator is disposed further on an inner side than the outermost diameter portion of the first transmission or the second transmission. Therefore, it is possible to suppress an increase in the size in the radial direction due to the arrangement of the actuator.

According to the eighth aspect, the second one-way power transmission unit capable of mechanically transmitting the rotational power in the other direction of the driving source side to the driven portion side is provided. Therefore, it is possible to reduce the fastening energy of a brake unit, which is necessary in the related art when (for example, during rearward travelling) the rotational power in the other direction of the driving source side is transmitted to the driven portion side. Further, the second one-way power transmission unit can mechanically transmit the rotational power in one direction of the driven portion side to the driving source side, and thus it is possible to reduce the fastening energy of the brake unit, which is necessary in the related art when (for example, during decelerating regenerative travelling) the rotational power in one direction of the driven portion side is transmitted to the driving source side. In the power transmission path in which the second one-way power transmission unit is provided, the switching unit for bringing the second one-way power transmission unit into an effective state or an ineffective state is provided in series. Therefore, in a situation (for example, during the forward high-speed travelling) in which it is undesirable to transmit the rotational power in one direction of the driven portion side to the driving source side, mechanical power transmission by the second one-way power transmission unit can be interrupted.

According to the ninth aspect, the first one-way power transmission unit, the second one-way power transmission unit, and the switching unit are disposed in the mutually connected third rotation elements of the first transmission and the second transmission. Thus, the speed change states of the first transmission and the second transmission can be controlled by a group of the first one-way power transmission unit, the second one-way power transmission unit, and the switching unit.

According to the tenth aspect, the first one-way power transmission unit, the second one-way power transmission unit, and the switching unit are disposed between the first transmission and the second transmission in the vehicle width direction. Therefore, it is possible to suppress an increase in the size in the radial direction due to the arrangement of the first one-way power transmission unit, the second one-way power transmission unit, and the switching unit.

According to the eleventh aspect, the first one-way power transmission unit, the second one-way power transmission unit, and the switching unit are arranged further on an inner side than the outermost diameter portions of the first transmission and the second transmission in the radial direction. Therefore, it is possible to reliably suppress an increase in the size in the radial direction due to the arrangement of the first one-way power transmission unit, the second one-way power transmission unit, and the switching unit.

According to the twelfth aspect, the first one-way power transmission unit, the second one-way power transmission unit, and the switching unit are arranged on either one side of the first transmission or the second transmission in the vehicle width direction and on the radially outer side, and thus it is possible to suppress an increase in the size in the vehicle width direction due to the arrangement of the first one-way power transmission unit, the second one-way power transmission unit, and the switching unit.

According to the thirteenth aspect, since the actuator for controlling activation or deactivation of the switching unit is disposed on the other side of the first transmission and the second transmission in the vehicle width direction and on the outer side in the radial direction, it is possible to suppress an increase in the size in the vehicle width direction due to the arrangement of the actuator.

According to the fourteenth aspect, the first one-way power transmission unit, the second one-way power transmission unit, and the switching unit are arranged further on an inner side than the outermost diameter portions of the first transmission and the second transmission in the radial direction. Therefore, it is possible to reliably suppress an increase in the size in the radial direction due to the arrangement of the first one-way power transmission unit, the second one-way power transmission unit, and the switching unit.

According to the fifteenth aspect, the second one-way power transmission unit capable of mechanically transmitting the rotational power in the other direction of the driving source side to the driven portion side is provided. Therefore, it is possible to reduce the fastening energy of a brake unit, which is necessary in the related art when (for example, during rearward travelling) the rotational power in the other direction of the driving source side is transmitted to the driven portion side. Further, the second one-way power transmission unit can mechanically transmit the rotational power in one direction of the driven portion side to the driving source side, and thus it is possible to reduce the fastening energy of the brake unit, which is necessary in the related art when (for example, during decelerating regenerative travelling) the rotational power in one direction of the driven portion side is transmitted to the driving source side. In the power transmission path in which the second one-way power transmission unit is provided, the switching unit for bringing the second one-way power transmission unit into an effective state or an ineffective state is provided in series. Therefore, in a situation (for example, during the forward high-speed travelling) in which it is undesirable to transmit the rotational power in one direction of the driven portion side to the driving source side, mechanical power transmission by the second one-way power transmission unit can be interrupted.

In addition, the abutment position where the ring rotating body of the left transmission and the ring rotating body of the right transmission directly or indirectly abut on each other is located at the substantially same diameter position as the meshing position between the ring rotating body of the left transmission and the planetary rotating body of the left transmission and the meshing position between the ring rotating body of the right transmission and the planetary rotating body of the right transmission. Therefore, in each of the left transmission and the right transmission, it is possible to suppress the generation of the bending moments in the inward flange portions due to the forces generated by meshing of the ring rotating bodies and the planetary rotating bodies. Therefore, the weight of the inward flange portions can be reduced.

In addition, when each rotating body is constituted by gears, it is possible to prevent the meshing portion from being inclined due to the bending moment. Therefore, favorable tooth contact can be obtained even at large torque, and thus vibration properties are improved.

According to the sixteenth aspect, in the left transmission and the right transmission, the meshing portions between the ring rotating bodies and the planetary rotating bodies are formed such that forces act in the directions in which the left transmission and the right transmission approach each other when rotational power in one direction of the driving source side is input to the wheel side. Therefore, it is possible to cancel the forces generated at the time of meshing of the ring rotating bodies and the planetary rotating bodies.

According to the seventeenth aspect, generally, the driving torque generated when the vehicle moves forward is larger than the regenerative torque generated when regeneration is performed. Therefore, if there is no bending moment in the ring rotating bodies which is generated when the vehicle moves forward, the weight of the ring rotating bodies can be reduced.

According to the eighteenth aspect, the first one-way power transmission unit, the second one-way power transmission unit, and the switching unit are arranged on either one side of the first transmission or the second transmission in the vehicle width direction and on the radially outer side, and thus it is possible to suppress an increase in the size in the vehicle width direction due to the arrangement of the first one-way power transmission unit, the second one-way power transmission unit, and the switching unit.

According to the nineteenth aspect, the second one-way power transmission unit capable of mechanically transmitting the rotational power in the other direction of the driving source side to the driven portion side is provided. Therefore, it is possible to reduce the fastening energy of a brake unit, which is necessary in the related art when (for example, during rearward travelling) the rotational power in the other direction of the driving source side is transmitted to the driven portion side. Further, the second one-way power transmission unit can mechanically transmit the rotational power in one direction of the driven portion side to the driving source side, and thus it is possible to reduce the fastening energy of the brake unit, which is necessary in the related art when (for example, during decelerating regenerative travelling) the rotational power in one direction of the driven portion side is transmitted to the driving source side. In the power transmission path in which the second one-way power transmission unit is provided, the switching unit for bringing the second one-way power transmission unit into an effective state or an ineffective state is provided in series. Therefore, in a situation (for example, during the forward high-speed travelling) in which it is undesirable to transmit the rotational power in one direction of the driven portion side to the driving source side, mechanical power transmission by the second one-way power transmission unit can be interrupted.

Further, the ring rotating body of the left transmission and the ring rotating body of the right transmission are connected to each other via the connecting member fitted from the outer diameter side thereof and the connecting member is provided with the through hole passing through the inner circumferential surface and the outer circumferential surface. Therefore, the lubricating oil can be supplied from the oil reservoir provided above the connecting member to the fitting portions between the ring rotating body of the left transmission and the ring rotating body of the right transmission and the connecting member via the through hole. In this manner, by supplying the lubricating oil from the outer circumferential portion of the connecting member to the fitting portion, the lubrication path can be simply provided.

By supplying the lubricating oil from the oil reservoir provided above the connecting member to the outer circumferential surface of the connecting member, a dedicated electric oil pump or the like is not necessary, and thus the manufacturing cost can be suppressed.

Furthermore, the oil leaking from a hydraulic circuit can be used as the lubricating oil and it is possible to suppress supplying an excessive amount of oil to the fitting portion by adjusting the amount of oil leaking from the hydraulic circuit.

According to the twentieth aspect, the through hole is disposed between the ring spline portion provided on the ring rotating body of the left transmission and the ring spline portion provided on the ring rotating body of the right transmission, and thus it is possible to appropriately supply the lubricating oil to both fitting portions.

According to the twenty-first aspect, the through hole is the through hole provided in the annular groove accommodating the circlip arranged between the left connecting spline portion and the right connecting spline portion. Therefore, the lubricating oil supplied from the outer circumferential portion of the connecting member passes through the through hole, and then the lubricating oil is distributed to the left connecting spline portion side and the right connecting spline portion side by the circlip. Thereby, the lubricating oil can be appropriately supplied to both fitting portions.

According to the twenty-second aspect, a predetermined gap is provided between the circlip and the through hole, and thus the through hole is prevented from being blocked by the circlip.

According to the twenty-third aspect, the recessed groove connecting the plurality of through holes is provided on the outer circumferential surface of the connecting member. Therefore, the lubrication oil supplied from the outer circumferential portion of the connecting member can be guided to the plurality of through holes via the recessed groove.

According to the twenty-fourth aspect, the abutment position where the ring rotating body of the left transmission and the ring rotating body of the right transmission directly or indirectly abut on each other is located at the substantially same diameter position as the meshing position between the ring rotating body of the left transmission and the planetary rotating body of the left transmission and the meshing position between the ring rotating body of the right transmission and the planetary rotating body of the right transmission. Therefore, the connecting member is positioned further on the outer diameter side, and thus the supply of the lubricating oil to the connecting member becomes easier.

According to the twenty-fifth aspect, the first one-way power transmission unit, the switching unit, the second one-way power transmission unit, the actuator, and the oil reservoir can be compactly arranged on the outer diameter side of the left transmission and the right transmission.

BRIEF DESCRIPTION OF THE DRAWINGS

FIG. 5C is an operation explanatory view illustrating an engagement regulation state of the second one-way clutch.

FIG. 6 is a table describing operating states of a front-wheel driving device (FDS), a rear-wheel driving device (RDS), a first and second electric motors (rear motors), and the two-way clutch (OWC1, SLC, and OWC2) in each vehicle state.

MODE FOR CARRYING OUT THE INVENTION

First, a first embodiment of a driving device according to the invention will be described with reference to FIGS. 1 to 11.

Figure 1:
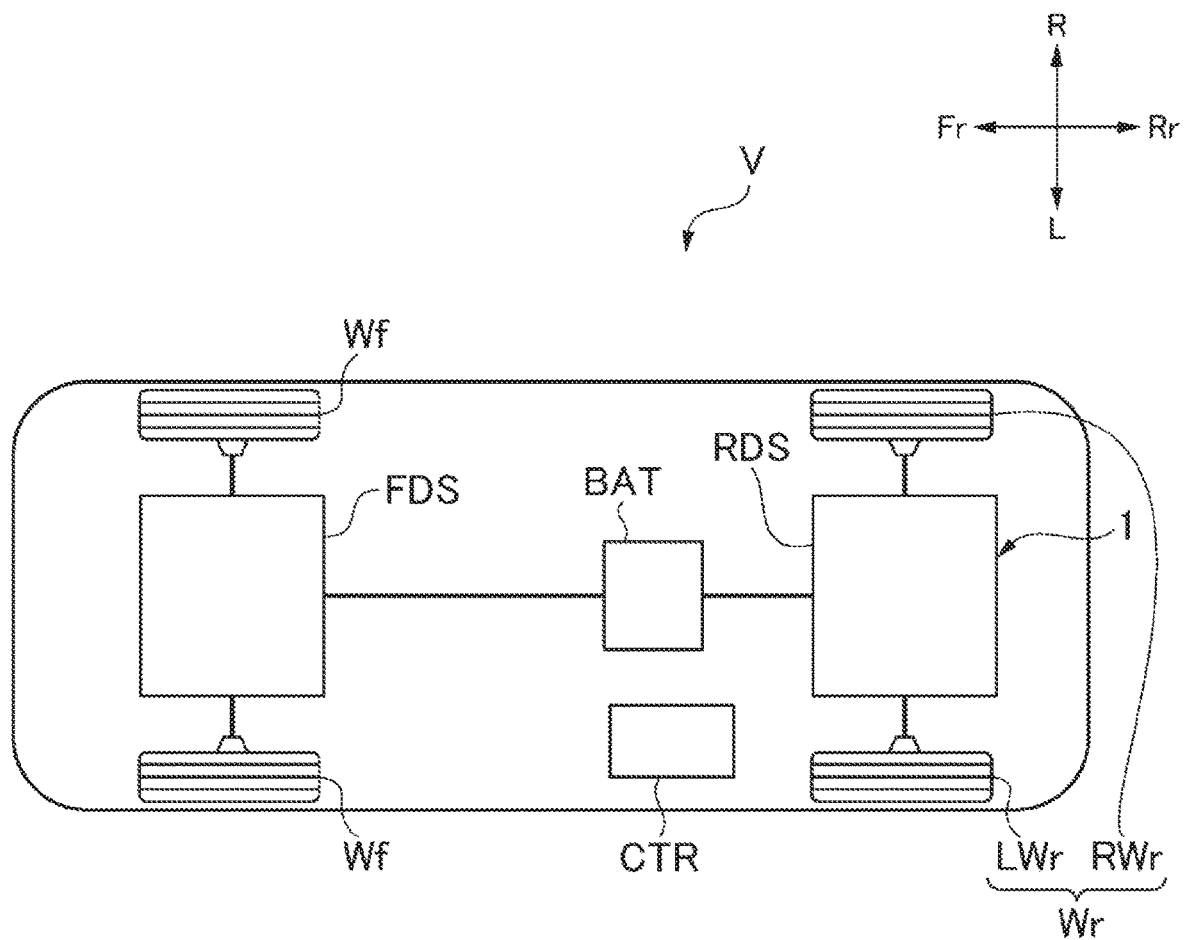
FIG. 1 is a block diagram illustrating a schematic configuration of a hybrid vehicle which is an embodiment of a vehicle on which a driving device according to the invention can be mounted.

The driving device of the embodiment uses an electric motor as a drive source for driving an axle and is used, for example, in a vehicle of a drive system as illustrated in FIG. 1.

[Vehicle]

A vehicle V illustrated in FIG. 1 is a hybrid vehicle having a driving device FDS (hereinafter referred to as a "front wheel driving device") in which an internal combustion engine (not illustrated) and an electric motor are connected in series in a front of the vehicle. In the vehicle V, the power of the front-wheel driving device FDS is transmitted to a front wheel Wf and the power of a driving device RDS (hereinafter, referred to as a "rear-wheel driving device 1") provided in a rear of the vehicle separately from the front-wheel driving device FDS is transmitted to a rear wheel Wr (RWr, LWr). The electric motor of the front-wheel driving device FDS and first and second electric motors 2A and 2B (see FIGS. 2 and 3) of the rear-wheel driving device 1 are connected to a battery BAT and it is possible to receive electricity from the battery BAT and regenerate energy to the battery BAT. Reference characters CTR of FIG. 1 indicates a control device for performing various controls of the entirety of a vehicle.

[Rear-Wheel Driving Device]

Figure 2:
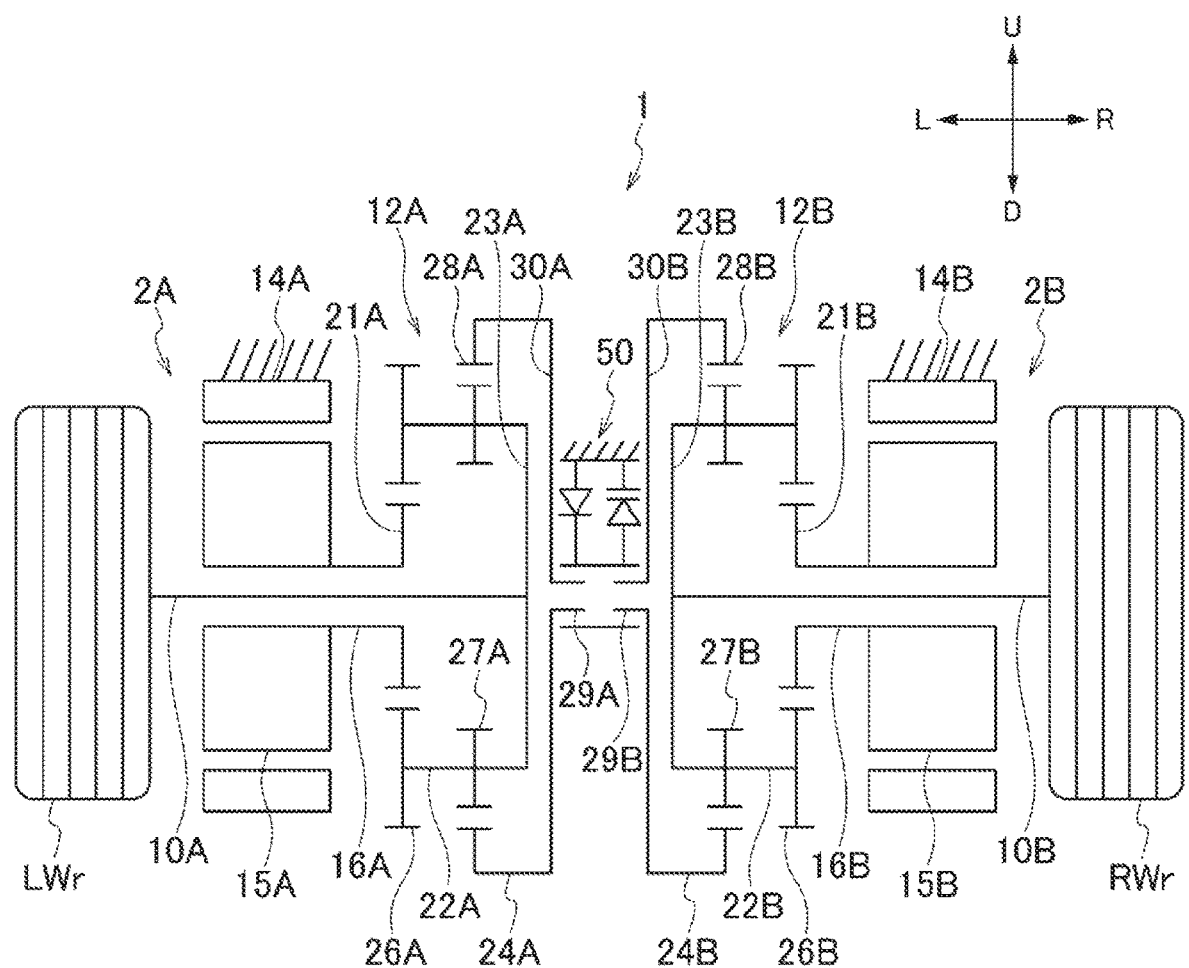
FIG. 2 is a skeleton diagram of a first embodiment of a rear-wheel driving device.
Figure 3:
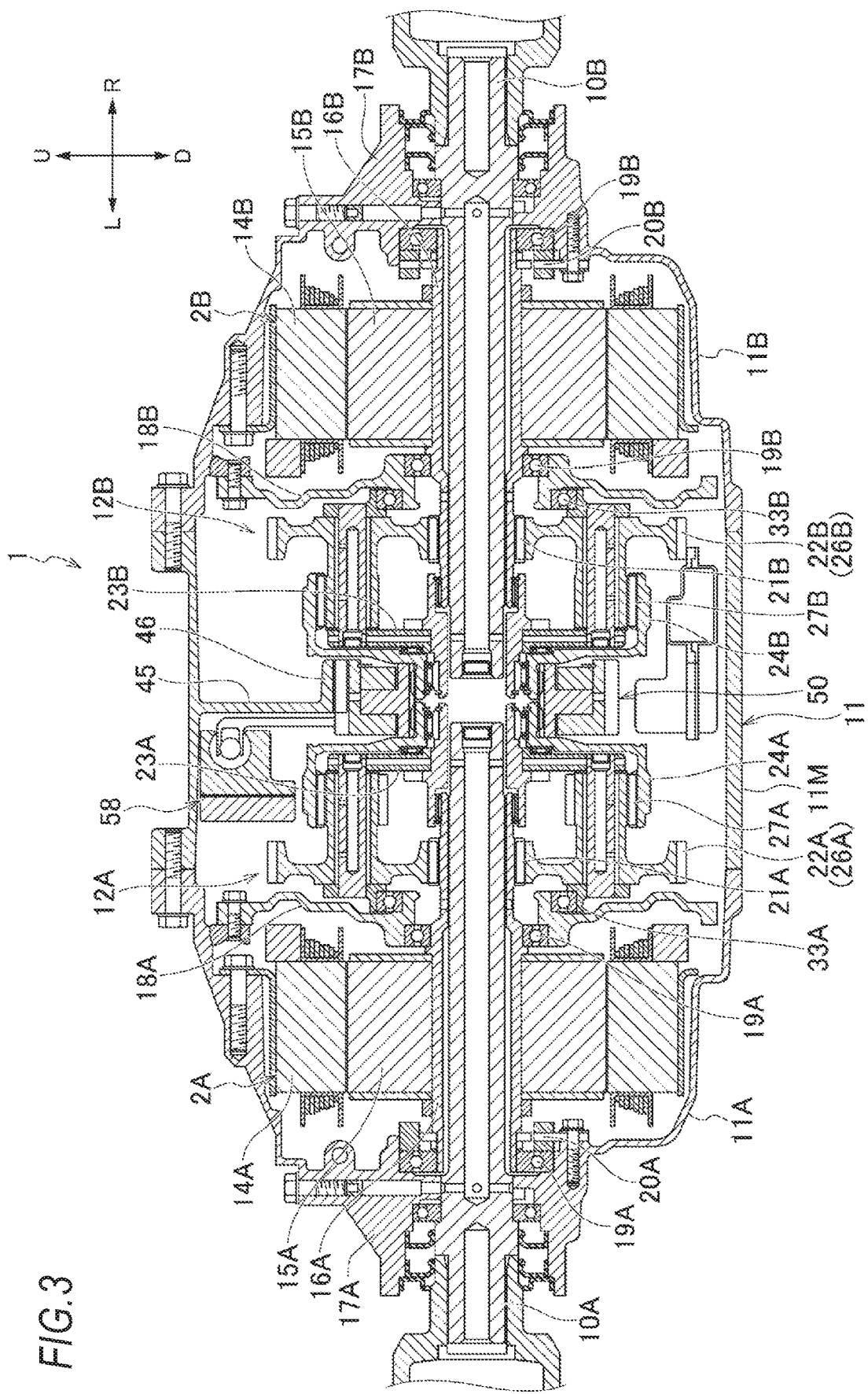
FIG. 3 is a longitudinal cross-sectional view of the first embodiment of the rear-wheel driving device.

FIGS. 2 and 3 illustrate an internal configuration of the rear-wheel driving device 1, in which reference numerals and characters 10A and 10B indicate left and right axles on the rear wheel Wr side of the vehicle V and are arranged coaxially in a vehicle width direction. A case 11 of the rear-wheel driving device 1 is formed in a substantially cylindrical shape as a whole. In the case 11, first and second electric motors 2A and 2B for driving the axles and first and second planetary-gear-type speed reducers 12A and 12B for reducing the driving rotation of the first and second electric motors 2A and 2B are disposed coaxially with the axles 10A and 10B. The first electric motor 2A and the first planetary-gear-type speed reducer 12A function as a left wheel driving device for driving a left rear wheel LWr and the second electric motor 2B and the second planetary-gear-type speed reducers 12B function as a right wheel driving device for driving a right rear wheel RWr. The first electric motor 2A and the first planetary-gear-type speed reducer 12A, and the second electric motor 2B and the second planetary-gear-type speed reducer 12B are arranged right-left symmetrically in the vehicle width direction in the case 11. The case 11 is provided with a central case 11M constituting a center portion of the case 11 in the vehicle width direction and side cases 11A and 11B constituting left and right side portions of the case 11.

In the first and second electric motors 2A and 2B, stators 14A and 14B are respectively fixed to side cases 11A and 11B and rotors 15A and 15B of an annular shape are rotatably disposed on inner circumferential sides of the stators 14A and 14B. Electric motor output shafts 16A and 16B having a cylindrical shape and surrounding the outer circumferences of the axles 10A and 10B are coupled to inner circumference portions of the rotors 15A and 15B and the electric motor output shafts 16A and 16B are supported via bearings 19A and 19B on end walls 17A and 17B of the side cases 11A and 11B and partition walls 18A and 18B so as to be rotatable coaxially with and relatively to the axles 10A and 10B, in portions which are in the end walls 17A and 17B and located outer circumferences of one end sides of the electric motor output shafts 16A and 16B, resolvers 20A and 20B for performing feedback of the rotational position information of the rotor 15A and 15B to a control device CTR of the first and second electric motors 2A and 2B are provided. The first and second electric motors 2A and 2B including the stators 14A and 14B and the rotors 15A and 15B have the same radius and the first and second electric motors 2A and 2B are arranged mirror-symmetrically to each other. The axle 10A and the electric motor output shaft 16A pass through the inside of the first electric motor 2A and extend from both ends of the first electric motor 2A. Also, the axle 10B and the electric motor output shaft 16B pass through the inside of the second electric motor 2B and extend from both ends of the second electric motor 29.

[Planetary-Gear-Type Speed Reducer]

The first and second planetary-gear-type speed reducers 12A and 12B include sun gears 21A and 21B, ring gears 24A and 24B, a plurality of planetary gears 22A and 22B meshing with the sun gears 21A and 21B and the ring gears 24A and 24B, and planetary carriers 23A and 23B which support the planetary gears 22A and 22B so that the planetary gears 22A and 22B can rotate and revolve. The driving forces of the first and second electric motors 2A and 2B are input from the sun gears 21A and 21B and decelerated driving rotation is output to the axles 10A and 10B through the planetary carriers 23A and 23B.

Figure 4:
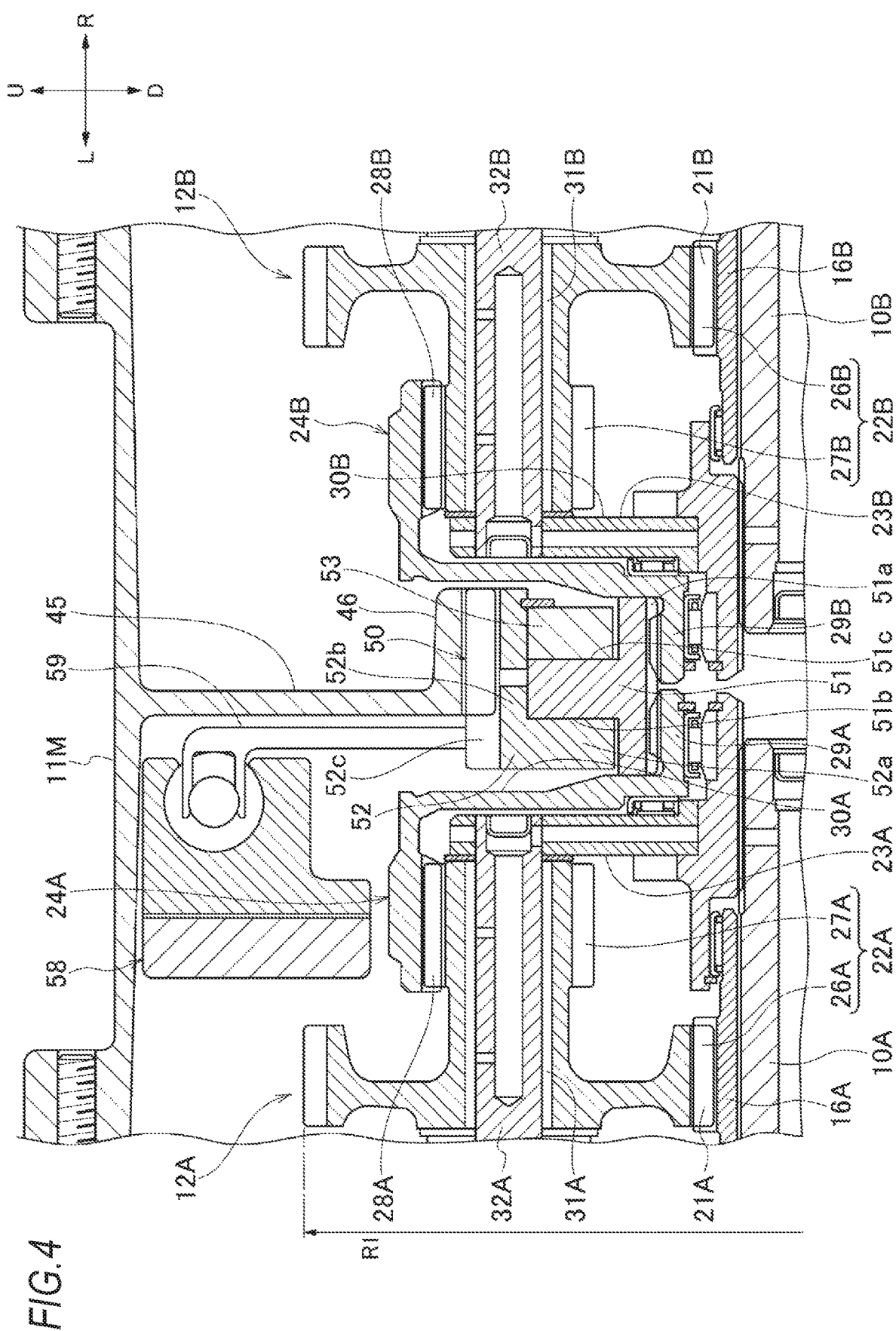
FIG. 4 is a partially enlarged view of the rear-wheel driving device illustrated in FIG. 3.

The sun gears 21A and 21B are integrally formed on the electric motor output shafts 16A and 16B. The planetary gears 22A and 22B are double pinions having first pinions 26A and 26B having a lager diameter and being directly engaged with the sun gears 21A and 21B and second pinions 27A and 27B having a smaller diameter than that of the first pinions 26A and 26B. Those first pinions 26A and 26B and the second pinions 27A and 27B are integrally formed in a state where the first pinions 26A and 26B and the second pinions 27A and 27B are coaxially offset in an axial direction. As illustrated in FIG. 4, the planetary gears 22A and 22B are supported by pinion shafts 32A and 32B of the planetary carriers 23A and 23B via needle bearings 31A and 31B. Axially inner-side end portions of the planetary carriers 23A and 23B extend inward in a radial direction and are spline-fitted to the axles 10A and 10B so as to be integrally rotatable, and further, the planetary carriers 23A and 23B are supported by the partition walls 18A and 18B via bearings 33A and 33B.

The ring gears 24A and 24B are constituted to have gear portions 28A and 28B of which inner circumferential surfaces are engaged with the second pinions 27A and 27B of a small diameter, small diameter portions 29A and 29B smaller in diameter than the gear portions 28A and 28B and arranged to face each other at an intermediate position of the case 11, and connecting portions 30A and 30B for connecting axially inner-side end portions of the gear portions 28A and 28B and axially outer-side end portions of the small diameter portions 29A and 29B in the radial direction.

The gear portions 28A and 28B are opposed to each other in the axial direction while interposing therebetween a cylindrical wall 46 formed on the inner diameter-side end portion of a left and right separation wall 45 of the central case 11M. A space portion is secured between the connecting portions 30A and 30B of the ring gears 24A and 24B which face each other in the axial direction and a two-way clutch 50 described below is disposed in the space portion. Outer circumferential surfaces of the small diameter portions 29A and 29B are respectively spline-fitted to an inner circumferential portion of a rotating plate 51 of the two-way clutch 50 described below. Therefore, the ring gears 24A and 24B are connected to the rotating plate 51 of the two-way clutch 50 so as to rotate integrally therewith. An inner circumferential portion of the cylindrical wall 46 is spline-fitted to an outer circumferential portion of a first fixing plate 52 of the two-way clutch 50 described below. Therefore, the first fixing plate 52 of the two-way clutch 50 is positioned by the central case 11M and is prevented from rotating.

[Two-Way Clutch]

As illustrated in FIG. 4 and FIGS. 5A to 5C, the two-way clutch 50 is constituted to have the rotating plate 51, the first fixing plate 52, a second fixing plate 53, and a selector plate 54. The rotating plate 51 is an annular plate member and a spline 51a to be spline-engaged with the small diameter portions 29A and 29B of the ring gears 24A and 24B is formed on the inner circumferential portion thereof. The rotating plate 51 has a first opposing surface 51b opposed to the first fixing plate 52 on one side in the axial direction and a second opposing surface 51c opposed to the second fixing plate 53 on the other side in the axial direction. On the second opposing surface 51c, a plurality of protrudable and retractable second engagement pieces 55 biased toward the second fixing plate 53 by springs 55a are arranged at a predetermined interval in the circumferential direction. On the first opposing surface 51b, a plurality of groove-shaped first engagement recess portions 51d to be engaged with the first engagement pieces 56 described below are formed at a predetermined interval in the circumferential direction.

The first fixing plate 52 integrally has a plate portion 52a of an shape and a cylindrical portion 52b extending in the axial direction from the outer circumferential portion of the plate portion 52a and a spline 52c to be spline-fitted to the inner circumferential portion of the cylindrical wall 46 of the central case 11M is formed on the outer circumferential portion of the cylindrical portion 52b. The inner circumferential portion of the cylindrical portion 52b rotatably supports the outer circumferential portion of the rotating plate 51 and is spline-fitted to the outer circumferential portion of the second fixing plate 53 in a non-rotatable manner. Further, on a surface of the plate portion 52a, the surface facing the first opposing surface 51b of the rotating plate 51, a plurality of protrudable and retractable first engagement pieces 56 biased to the rotating plate 51 by springs 56a are arranged at a predetermined interval in the circumferential direction. Therefore, a second one-way clutch OWC2 which becomes in a disengaged state (OFF: see FIG. 5B) in which the first engagement piece 56 is disengaged from the first engagement recess portion 51d of the rotating plate 51 when the rotating plate 51 rotates in one direction (the direction of the white arrow in FIG. 5B) and an engagement state (ON: see FIG. 5A) in which the first engagement piece 56 engages with the first engagement recess portion 51d of the rotating plate 51 when the rotating plate 51 rotates in the other direction (the direction of the black arrow in FIG. 5A) is formed between the first fixing plate 52 and the rotating plate 51.

Focusing only on the second one-way clutch OWC2, when the second one-way clutch OWC2 is in the disengaged state, free rotation of the rotating plate 51 and the ring gear 24A and 24B coupled to the rotating plate 51 in one direction (the direction of the white arrow in FIG. 5B) is permitted, and thus a power transmission path between the first and second electric motors 2A and 2B and the rear wheels Wr is interrupted. On the other hand, when the second one-way clutch OWC2 is in an engaged state, the rotation of the rotating plate 51 and the ring gear 24A and 24B coupled to the rotating plate 51 in the other direction (the direction of the black arrow in FIG. 5A) is restricted, and thus a power transmission path between the first and second electric motors 2A and 2B and the rear wheels Wr is connected.

More specifically, the second one-way clutch OWC2 is provided on the power transmission path between the first and second electric motors 2A and 2B and the rear wheels Wr. The second one-way clutch OWC2 becomes in a disengaged state then rotational power in a forward direction (rotational direction when advancing the vehicle V) of the first and second electric motors 2A and 2B side is input to the rear wheel Wr side and the second one-way clutch OWC2 becomes in an engaged state when the rotational power in a reverse direction of the first and second electric motors 2A and 2B side is input to the rear wheel Wr side. Further, the second one-way clutch OWC2 becomes in an engaged state when rotational power in the forward direction of the rear wheel Wr side is input to the first and second electric motors 2A and 2B side and the second one-way clutch OWC2 becomes in a disengaged state when rotational power in the reverse direction of the rear wheel Wr side is input to the first and second electric motors 2A and 2B side.

The second fixing plate 53 is an annular plate member and the outer circumferential portion thereof is spline-fitted to the first fixing plate 52. Further, on a surface of the second fixing plate 53, the surface facing the second opposing surface 51c of the rotating plate 51, a plurality of groove-shaped second engagement recesses 53b to be engaged with the second engagement piece 55 are formed at a predetermined interval in the circumferential direction. As a result, a first one-way clutch OWC1 is formed between the rotating plate 51 and the second fixing plate 53. The first one-way clutch OWC1 becomes an engaged state (ON: see FIG. 5B) in which the second engagement piece 55 engages with the second engagement recess portion 53d of the second fixing plate 53 when the rotating plate 51 rotates in one direction (direction of the white arrow in FIG. 5B) and the first one-way clutch OWC1 becomes a disengaged state (OFF: see FIGS. 5A and 5C) in which the second engagement piece SS does not engage with the second engagement recess portion 53d of the second fixing plate 53 when the rotating plate 51 rotates in the other direction (direction of the black arrow in FIGS. 5A and 5C).

Focusing only on the first one-way clutch OWC1, when the first one-way clutch OWC1 is engaged, the rotation of the rotating plate 51 and the ring gears 24A and 24B coupled with the rotating plate 51 in one direction (direction of the white arrow in FIG. 5B) is restricted, and thus a power transmission path between the first and second electric motors 2A and 2B and the rear wheels Wr is connected. On the other hand, when the first one-way clutch OWC1 is in a disengaged state, a free rotation of the rotating plate 51 and the ring gears 24A and 24B coupled with the rotating plate 51 in the other direction (direction of the black arrow in FIG. 5A) is permitted, and thus the power transmission path between the first and second electric motors 2A and 2B and the rear wheels Wr is interrupted.

More specifically, the first one-way clutch OWC1 is provided in parallel with the second one-way clutch OWC2 on the power transmission path between the first and second electric motors 2A and 2B and the rear wheels Wr. The first one-way clutch OWC1 becomes an engaged state when the rotational power in the forward direction of the first and second electric motors 2A and 2B is input to the rear wheel Wr side and the first one-way clutch OWC1 becomes a disengaged state when the rotational power in the reverse direction of the first and second electric motors 2A and 2B is input to the rear wheel Wr side. Further, the first one-way clutch OWC1 becomes in a disengaged state when the rotational power in the forward direction of the rear wheel Wr side is input to the first and second electric motors 2A and 2B side and the first one-way clutch OWC1 becomes in an engaged state when the rotational power in the reverse direction of the rear wheel Wr side is input to the first and second electric motors 2A and 2B side.

The selector plate 54 is an annular-shaped thin plate member and is disposed between the first fixing plate 52 and the first opposing surface 51b of the rotating plate 51. On the selector plate 54, a plurality of window portions 54a allowing the protrusion and retraction of the first engagement pieces 56 are formed at a predetermined interval in the circumferential direction. The selector plate 54 is supported so as to be displaced (rotatable) in the circumferential direction within the cylindrical portion 52b of the first fixing plate 52 and constitutes a switching unit SLC which can be switched between a deactivated state (OPEN: see FIGS. 5A and 5B) allowing the engagement of the first engagement piece 56 with the first engagement recess portion 51d by setting the window portion 54a to be in agreement with the position of the first engagement piece 56 and an activated state (Close: see FIG. 5C) restricting the engagement of the first engagement piece 56 with the first engagement recess portion 51d without setting the window portion 54a to be in agreement with the position of the first engagement piece 56.

As described above, originally, when the rotating plate 51 rotates in the other direction (direction of the black arrow in FIG. 5A), the first engagement piece 56 is brought into engagement (ON: see FIG. 5A) with the first engagement recess portion 51d of the rotating plate 51 by the second one-way clutch OWC2. However, when the switching unit SLC is in the activated state (CLOSE: see FIG. 5C), the engagement of the first engagement piece 56 to the first engagement recess portion 51d is restricted even when the rotating plate 51 rotates in the other direction (direction of the black arrow in FIGS. 5A and 5C). In this way, the selector plate 54 is switched between the deactivated state and the activated state, in such a manner that the second one-way clutch OWC2 becomes in an effective state or an ineffective state.

When the selector plate 54 is in a deactivated state, that is, when the second one-way clutch OWC2 is in an effective state, the second one-way clutch OWC2 becomes in a disengaged state or an engaged state according to the rotating direction of the rotating plate 51, as described above.

Figure 5A:
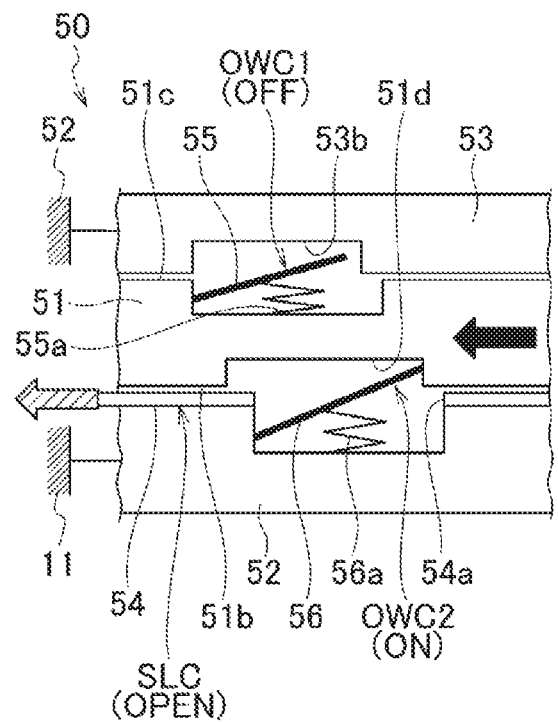
FIG. 5A is an operation explanatory view illustrating an engaged state of a second one-way clutch constituting a two-way clutch.

When the selector plate 54 is in an activated state, that is, when the second one-way clutch OWC2 is in an ineffective state, the second one-way clutch OWC2 also becomes in a disengaged state in addition to the first one-way clutch OWC1 even when the rotating plate 51 is rotated in the other direction (direction of the black arrow in FIGS. 5A and 5C). Therefore, free rotation of the rotating plate 51 and the ring gear 24A and 24B coupled with the rotating plate 51 in the other direction (direction of the black arrow in FIG. 5A) is permitted, and thus the power transmission path between the first and second electric motors 2A and 2B and the rear wheels Wr is interrupted.

Figure 5B:
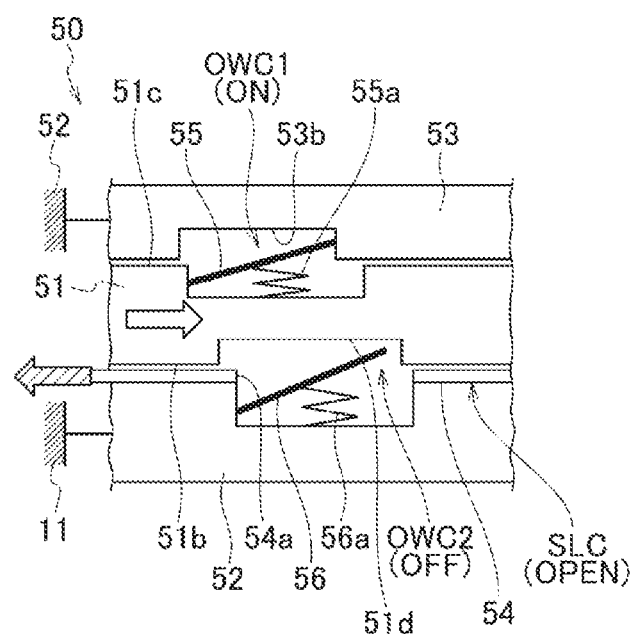
FIG. 5B is an operation explanatory diagram illustrating an engaged state of the first one-way clutch constituting the two-way clutch.

In other words, the selector plate 54 constitutes a connection/disconnection unit by which, during the operation thereof, the engagement of the first engagement piece 56 with the first engagement recess portion 51d is restricted so that the power transmission path between the first and second electric motors 2A and 2B and the rear wheels Wr is brought into an interrupted state (see FIG. 5C) and, during the non-operation thereof, the engagement of the first engagement piece 56 with the first engagement recess portion 51d is permitted so that the power transmission path between the first and second electric motors 2A and 2B and the rear wheel Wr becomes in a connection-permitted state (see FIGS. 5A and 5B).

More specifically, the selector plate 54 is provided in parallel with the first one-way clutch OWC1 and in series with the second one-way clutch OWC2 on the power transmission path between the first and second electric motors 2A and 2B and the rear wheels Wr and is switched between a deactivated state and an activated state by an actuator 58 provided in the rear-wheel driving device 1. An electric actuator or a hydraulic actuator is used as the actuator 58. Further, switching of the selector plate 54 is performed via a connection arm 59 (see FIG. 4) and the selector plate 54 is held in each state. However, the energy for holding the selector plate 54 in each state is extremely small as compared with the energy for maintaining the hydraulic clutch in a fastened state.

[Arrangement in Rear-Wheel Driving Device]

As illustrated in FIG. 3, in the rear-wheel driving device 1, first electric motor 2A and first planetary-gear-type speed reducer 12A are arranged in this order from the left outer side in the vehicle width direction and the second electric motor 2B and the second planetary-gear-type speed reducer 12B are arranged in this order from the right outer side in the vehicle width direction. Further, the first one-way clutch OWC1, the second one-way clutch OWC2, and the two-way clutch 50 constituting the switching unit SLC are disposed between the first planetary-gear-type speed reducer 12A and the second planetary-gear-type speed reducer 12B in the vehicle width direction. In this case, the two-way clutch 50 is disposed inside outermost diameter portions R1 of the first planetary-gear-type speed reducer 12A and the second planetary-gear-type speed reducer 12B.

Further, the actuator 58 for switching the selector plate 54 is disposed on the outer diameter side of the first planetary-gear-type speed reducer 12A. At least a part of the actuator 58 is disposed further on an inner side than the outermost diameter portion R1 of the first planetary-gear-type speed reducer 12A. The actuator 58 may be disposed on the outer diameter side of the second planetary-gear-type speed reducer 12B.

[Control Device]

A control device CTR illustrated in FIG. 1 is a control device for performing various control of the entirety of the vehicle. A wheel speed sensor value, motor rotational number sensor values of the first and second electric motors 2A and 2B, a steering angle, an accelerator pedal opening degree, a shift position, a charging state in the battery BAT, an oil temperature, and the like are input to the control device CTR. In addition, a signal for controlling the internal combustion engine, a signal for controlling the first and second electric motors 2A and 2B, a control signal for controlling the actuator 58, and the like are outputted from the control device CTR.

[Travelling Mode]

FIG. 6 is a table describing a relationship between the front-wheel driving device (FDS), the rear-wheel driving device (RDS), the first and second electric motors 2A (rear motors the two-way clutch (OWC1, SLC, and OWC2) in each vehicle state. In the drawing, a coast represents a driven state. FIGS. 7 to 11 illustrate speed collinear charts in respective states of the rear-wheel driving device 1 in which LMOT represents the first electric motor 2A, RMOT represents the second electric motor 2B, S and C on the left side respectively represent the sun gear 21A of the first planetary-gear-type speed reducer 12A and the planetary carrier 23A of the first planetary-gear-type speed reducer 12A, the first planetary-gear-type speed reducer 12A being connected to the first electric motor 2A, S and C on the right side respectively represent the sun gear 21B of the second planetary-gear-type speed reducer 12 and the planetary carrier 23B of the second planetary-gear-type speed reducer 12B, and R represents the ring gears 24A and 24B of the first and second planetary-gear-type speed reducers 12A and 12B.

The speed collinear chart illustrates a relationship between rotational speeds of respective rotation elements in the first and second planetary-gear-type speed reducers 12A and 12B. In the collinear chart, the distance from the reference (horizontal line) to a black circle represents the rotation speed of each rotation element. The first and second planetary-gear-type speed reducers 12A and 12B satisfy a collinear relationship in which rotational speeds thereof are always aligned on a single straight line in the speed collinear chart (also referred to as a collinear chart). In the following description, a rotation direction of the sun gears 21A and 21B at the time of forward movement of the vehicle by the first and second electric motors 2A and 2B is defined as the forward direction. Also, in the drawing, an upward direction indicates the rotation in the forward direction and the downward direction indicates the rotation in the reverse direction from a state where the vehicle is stopped. Further, an upward arrow represents torque in the forward direction and a downward arrow represents torque in the reverse direction.

Figure 7:
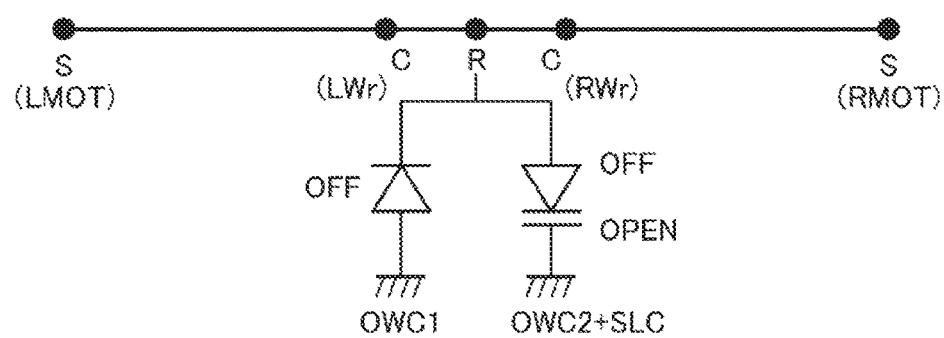
FIG. 7 is a speed collinear chart of the rear-wheel driving device when a vehicle is stopped.

During parking, neither the front-wheel driving device FDS nor the rear-wheel driving device 1 is driven. Therefore, as illustrated in FIG. 7, the first and second electric motors 2A and 2B of the rear-wheel driving device 1 are stopped and the axles 10A and 10B are also stopped, and thus torque does not act on either element. In this case, the switching unit SLC is in a deactivated state (OPEN). In addition, the first and second one-way clutches OWC1 and OWC2 are not engaged (OFF) because the first and second electric motors 2A and 2B are not driven.

Figure 8:
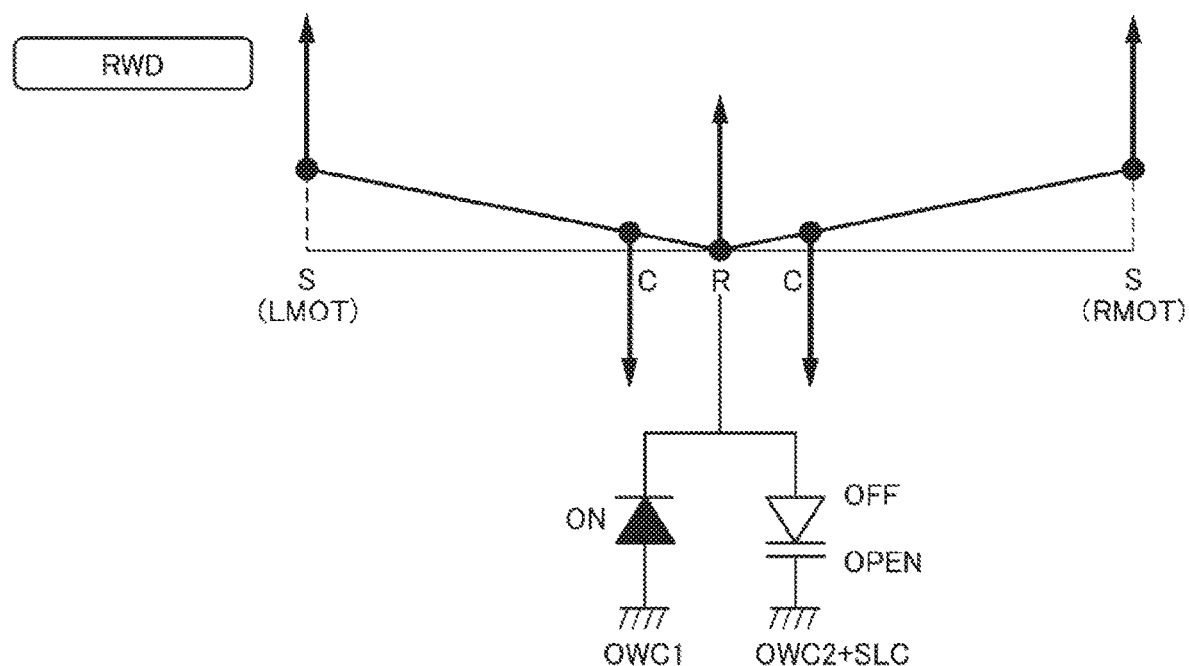
FIG. 8 is a speed collinear chart of the rear-wheel driving device during rear-wheel driving.

After a starter switch or a key position becomes in an ON state, rear-wheel driving by the rear-wheel driving device 1 is performed in forward low speed travelling with excellent motor efficiency, such as EV starting and EV cruising. As illustrated in FIG. 8, when the first and second electric motors 2A and 2B are driven in a power running manner so that the first and second electric motors 2A and 2B rotate in the forward direction while the switching unit SLC is kept in the deactivated state (OPEN), torque in the forward direction is added to the sun gear 21A and 21B as force points and torque in the reverse direction is applied to the ring gears 24A and 24B as action points with the planetary carriers 23A and 23B connected to the rear wheels Wr as fulcrums. As a result, torque in the reverse direction also acts on the rotating plate 51 coupled to the ring gears 24A and 24B and the rotating plate 51 rotates in one direction (direction of the white arrow in FIG. 5B) (see FIG. 5B). In this case, the second one-way clutch OWC2 becomes in a disengaged state, but the first one-way clutch OWC1 is engaged and the ring gears 24A and 24B are locked. As a result, the planetary carriers 23A and 23B rotate in the forward direction and the vehicle V travels forward. Travelling resistance from the axle 10A and 10B acts on the planetary carriers 23A and 23B in the reverse direction and reaction force by the first one-way clutch OWC1 acts on the ring gears 24A and 24B in the forward direction.

In this manner, when the vehicle V starts, the first and second electric motors 2A and 2B are driven in a power running manner so that forward power running torque is generated from the first and second electric motors 2A and 2B while the switching unit SLC is kept in the deactivated state (OPEN), and thus the first one-way clutch OWC1 is mechanically engaged and the first and second electric motors 2A and 2B side and the rear wheel Wr side are connected, and thus the power running torque of the first and second electric motors 2A and 2B is transmitted to the rear wheels Wr.

Figure 9A:
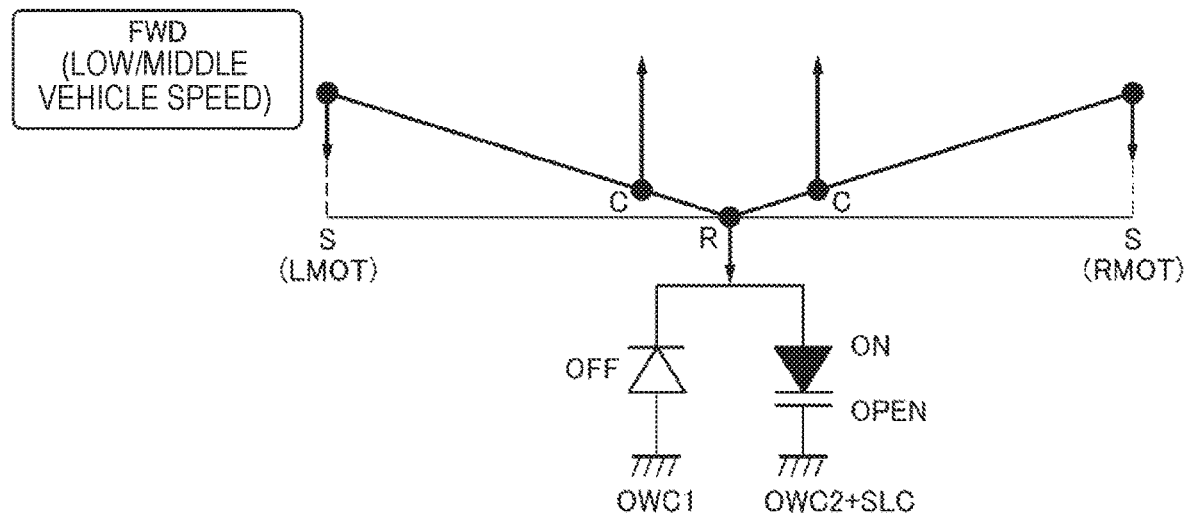
FIG. 9A is a speed collinear chart of the rear-wheel driving device during front-wheel driving (forward low/middle speed).

When the vehicle speed increases from the forward low speed travelling and reaches forward middle speed travelling with excellent engine efficiency, the rear-wheel drive by the rear-wheel driving device 1 is switched to the front-wheel drive by the front-wheel driving device FDS. As illustrated in FIG. 9A, when the power running drive of the first and second electric motors 2A and 2B is stopped while the switching unit SLC is in the deactivated state (OPEN), torque in the forward direction trying to make the vehicle travel forward acts on the planetary carriers 23A and 23B from the axles 10A and 10B. That is, torque in the forward direction is added to the planetary carriers 23A and 23B which are force points and torque in the forward direction acts on the ring gears 24A and 24B which are action points with the sun gears 21A and 21B connected to the first and second electric motors 2A and 2B as fulcrums. As a result, torque in the forward direction acts also on the rotating plate 51 coupled to the ring gear 24A and 24B, and thus the rotating plate 51 rotates in the other direction (direction of the black arrow in FIG. 5A) (FIG. 5A). In this case, although the first one-way clutch OWC1 becomes in a disengaged state, the second one-way clutch OWC2 becomes in an engaged state, so that the ring gears 24A and 24B are locked. Further, the friction of the first and second electric motors 2A and 2B acts on the sun gears 21A and 21B in the reverse direction and the reaction force by the second one-way clutch OWC2 acts on the ring gears 24A and 24B in the reverse direction. As described above, during the front-wheel drive not driving the first and second electric motors 2A and 2B, the first and second electric motors 2A and 2B side and the rear wheel Wr side are connected by engaging the second one-way clutch OWC2. Therefore, it is not necessary to perform rotation agreement of the first and second electric motors 2A and 2B when the forward middle speed travelling is shifted to decelerating regenerative travelling described below.

Figure 9B:
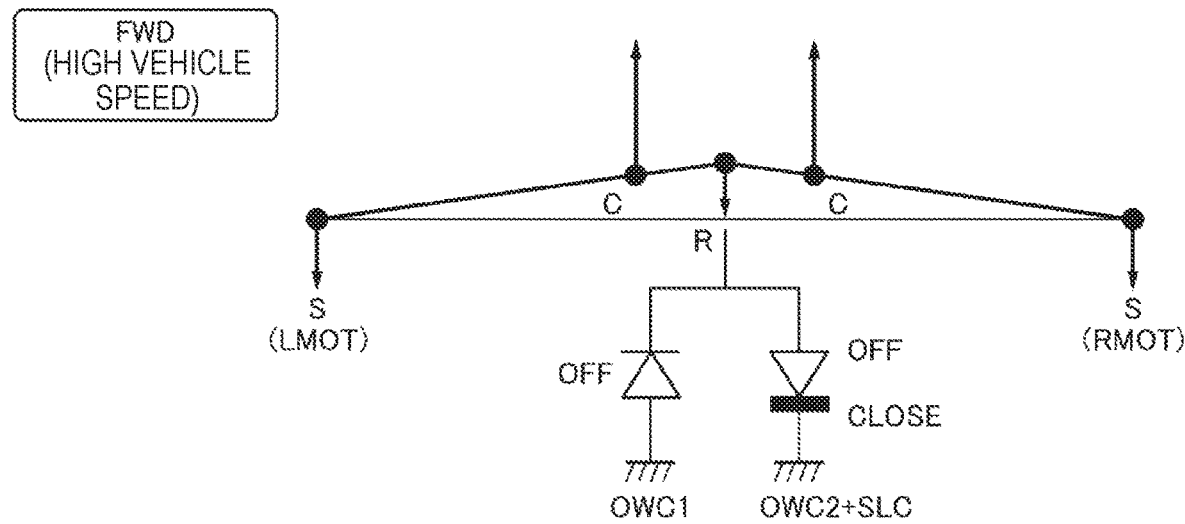
FIG. 9B is a speed collinear chart of the rear-wheel driving device during front-wheel driving (forward high-speed).

Also, as illustrated in FIG. 9B, during forward high-speed travelling, the front-wheel drive by the front-wheel driving device FDS is performed in the same manner as during the forward middle speed travelling. However, when the second one-way clutch OWC2 is engaged, there is a possibility that the first and second electric motors 2A and 2B may be over-rotated by the accompanying rotation. Thus, when the vehicle speed reaches a predetermined vehicle speed, the switching unit SLC is set to the activated state (CLOSE), so that the second one-way clutch OWC2 becomes in the ineffective state. As a result, both the first one-way clutch OWC1 and the second one-way clutch OWC2 become in the disengaged state and the rotation of the rotating plate 51 in the other direction (direction of the black arrow in FIG. 5C) is permitted (FIG. 5C) and, accordingly, the ring gears 24A and 24B rotate in the forward direction. Therefore, the first and second electric motors 2A and 2B side and the rear wheel Wr side become in the interrupted state, so that the accompanying rotation of the first and second electric motors 2A and 2B is prevented. The friction of the first and second electric motors 2A and 2B acts on the sun gears 21A and 21B in the reverse direction and the friction of the rotating plate 51 acts on the ring gears 24A and 24B in the reverse direction.

Figure 10:
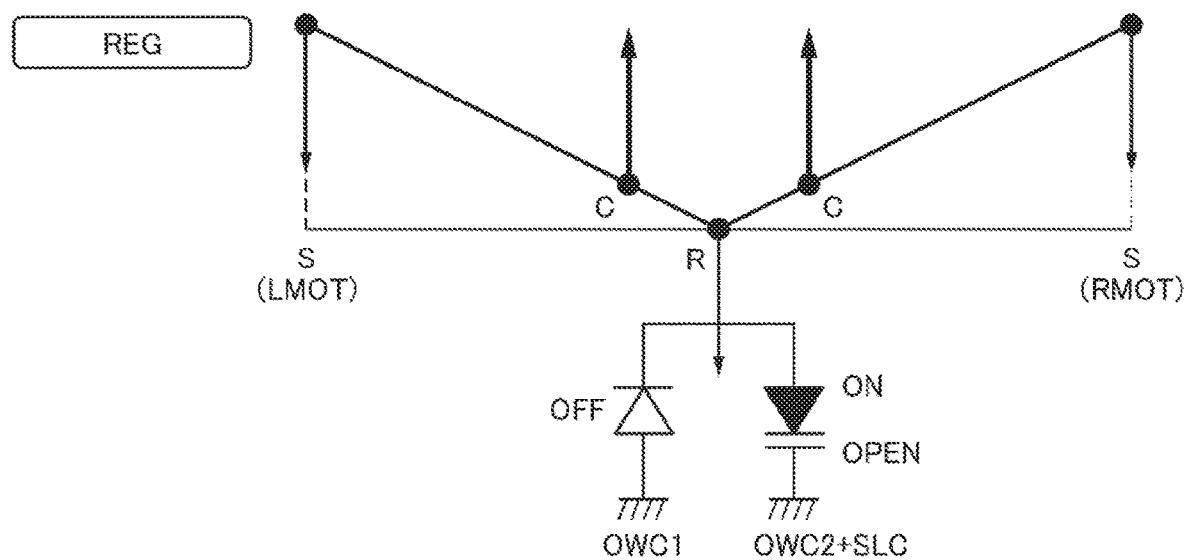
FIG. 10 is a speed collinear chart of the rear-wheel driving device during decelerating regenerative travelling.

When it is attempted to regeneratively drive the first and second electric motors 2A and 2B during the forward travelling, as illustrated in FIG. 10, torque in the forward direction trying to continue the forward travelling acts on the planetary carriers 23A and 23B from the axles 10A and 10B. That is, torque in the forward direction is added to the planetary carriers 23A and 23B which are force points and torque in the forward direction acts on the ring gears 24A and 24B which are action points with the sun gears 21A and 21B connected to the first and second electric motors 2A and 2B as fulcrums. As a result, torque in the forward direction acts also on the rotating plate 51 coupled to the ring gear 24A and 24B and the rotating plate 51 rotates in the other direction (direction of the black arrow in FIG. 5A) (FIG. 5A). In this case, although the first one-way clutch OWC1 becomes in the disengaged state, the second one-way clutch OWC2 becomes in the engaged state by setting the switching unit SLC to the deactivated state (OPEN), so that the ring gears 24A and 24B are locked. In this state, the first and second electric motors 2A and 2B are regeneratively driven so that regenerative torque in the reverse direction is generated from the first and second electric motors 2A and 2B, and thus deceleration regeneration is performed in the first and second electric motors 2A and 2B. As described above, when forward torque on the rear wheel Wr side is input to the first and second electric motors 2A and 2B side, the ring gears 24A and 24B are locked by the mechanical engagement of the second one-way clutch OWC2, and thus it is possible to reduce the energy loss as compared with a case of the related art where a hydraulic brake is fastened in such a situation.

Figure 11:
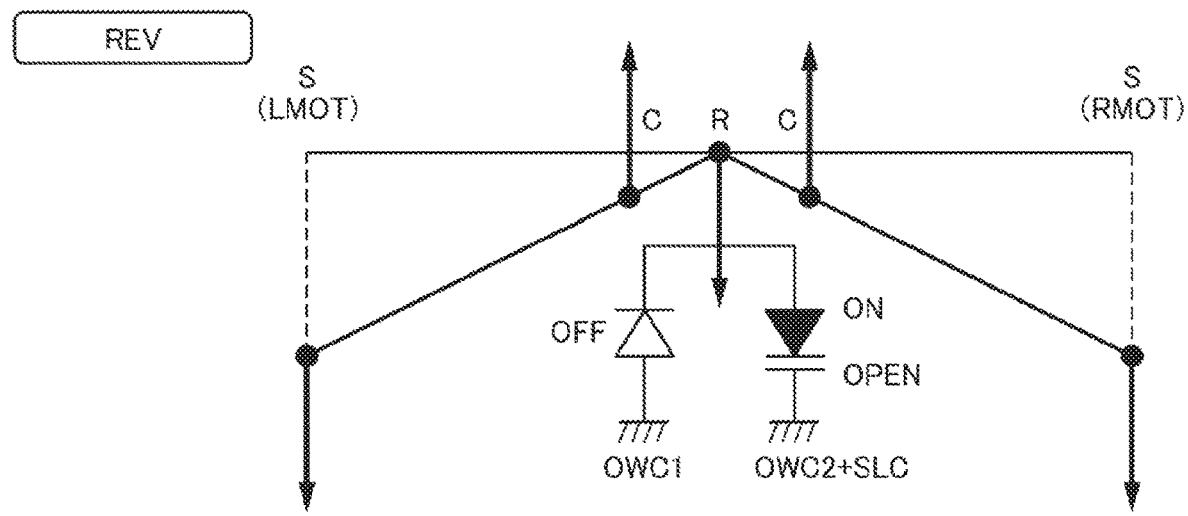
FIG. 11 is a speed collinear chart of the rear-wheel driving device during rearward travelling.

During rearward travelling, as illustrated in FIG. 11, when the first and second electric motors 2A and 2B are driven in a reverse power running manner so that the first and second electric motors 2A and 2B rotate in the reverse direction while the switching unit SLC is kept in the deactivated state (OPEN), torque in the reverse direction is added to the sun gears 21A and 21B which are force points and torque in the forward direction acts on the ring gears 24A and 24B which are action points with the planetary carriers 23A and 23B connected to the rear wheels Wr as fulcrums. As a result, torque in the forward direction acts also on the rotating plate 51 coupled to the ring gears 24A and 24B, and the rotating plate 51 rotates in the other direction (direction of the black arrow in FIG. 5A) (FIG. 5A). In this case, although the first one-way clutch OWC1 becomes in the disengaged state, the second one-way clutch OWC2 is engaged, and thus the ring gears 24A and 24B are locked. Therefore, the planetary carriers 23A and 23B rotate in the reverse direction and the vehicle V travels rearward. Travelling resistance from the axles 10A and 10B acts on the planetary carriers 23A and 23B in the forward direction and reaction force by the second one-way clutch OWC2 acts on the ring gears 24A and 24B in the reverse direction. As described above, when the reverse torque of the first and second electric motors 2A and 2B is input to the rear wheel Wr side, the first and second electric motors 2A and 2B side and the rear wheel Wr side are connected by the mechanical engagement of the second one-way clutch OWC2 and the reverse power running torque of the first and second electric motors 2A and 2B is transmitted to the rear wheels Wr. Therefore, it is possible to reduce the energy loss as compared with a case of the related art where a hydraulic brake is fastened in such a situation.

As described above, according to the embodiment, the second one-way clutch OWC2 capable of mechanically transmitting the reverse torque of the first and second electric motors 2A and 2B side to the rear wheel Wr side is provided. Therefore, it is possible to reduce the fastening energy of a brake unit, which is necessary in the related art when (for example, during rearward travelling) the reverse torque of the first and second electric motors 2A and 2B side is transmitted to the rear wheel Wr side.

Further, the second one-way clutch OWC2 can mechanically transmit the forward rotational power of the rear wheel Wr side to the first and second electric motors 2A and 2B side, and thus it is possible to reduce the fastening energy of the brake unit, which is necessary in the related art when (for example, during decelerating regenerative travelling) the forward rotational power of the rear wheel Wr side is transmitted to the first and second electric motors 2A and 2B side.

In the power transmission path in which the second one-way clutch OWC2 is provided, the switching unit SLC for bringing the power transmission path into the interrupted state or the connection-permitted state is provided in series. Therefore, in a situation (for example, during the forward high-speed travelling) in which it is undesirable to transmit the forward rotational power of the rear wheel Wr side to the first and second electric motors 2A and 2B side, mechanical power transmission by the second one-way clutch OWC2 can be interrupted.

Further, the first one-way clutch OWC1, the switching unit SLC, and the second one-way clutch OWC2 are disposed in the mutually connected ring gears 24A and 24B of the first and second planetary-gear-type speed reducers 12A and 12B. Thus, the speed change states of the first and second planetary-gear-type speed reducers 12A and 12B can be controlled by a group of the first one-way clutch OWC1, the switching unit SLC, and the second one-way clutch OWC2.

In addition, the first one-way clutch OWC1, the switching unit SLC, and the second one-way clutch OWC2 are disposed between the first planetary-gear-type speed reducer 12A and the second planetary-gear-type speed reducer 12B in the vehicle width direction. Therefore, it is possible to suppress an increase in the size in the radial direction due to the arrangement of the first one-way clutch OWC1, the switching unit SLC, and the second one-way clutch OWC2.

The first one-way clutch OWC1, the switching unit SLC, and the second one-way clutch OWC2 are arranged further on an inner side than the outermost diameter portions R1 of the first and second planetary-gear-type speed reducers 12A and 12B. Therefore, it is possible to reliably suppress an increase in the size in the radial direction due to the arrangement of the first one-way clutch OWC1, the switching unit SLC, and the second one-way clutch OWC2.

Further, since the actuator 58 for controlling the activated state or the deactivated state of the switching unit SLC is disposed on the outer diameter side of the first planetary-gear-type speed reducer 12A or the second planetary-gear-type speed reducer 12B, it is possible to suppress an increase in the size in the vehicle width direction due to the arrangement of the actuator 58.

Also, since at least a part of the actuator 58 is arranged further on the inner side than the outermost diameter portions R1 of the first planetary-gear-type speed reducer 12A or the second planetary-gear-type speed reducer 12B, it is possible to suppress an increase in the size in the radial direction due to the arrangement of the actuator 58.

Since the first one-way clutch OWC1, the switching unit SLC, and the second one-way clutch OWC2 are constituted by using a single-unit ratchet-type two-way clutch 50, it is possible to significantly reduce the size and cost as compared with a case where the first one-way clutch OWC1, the switching unit SLC, and the second one-way clutch OWC2 are separately constituted.

Next, Embodiments 2 to 7 of the rear-wheel driving device 1 of the invention will be described with reference to FIGS. 12 to 27. However, the same reference numerals and letters as in the embodiment described above are used for the configurations common to the embodiment described above and the description of the embodiment described above will not be repeated.

Second Embodiment

Figure 12:
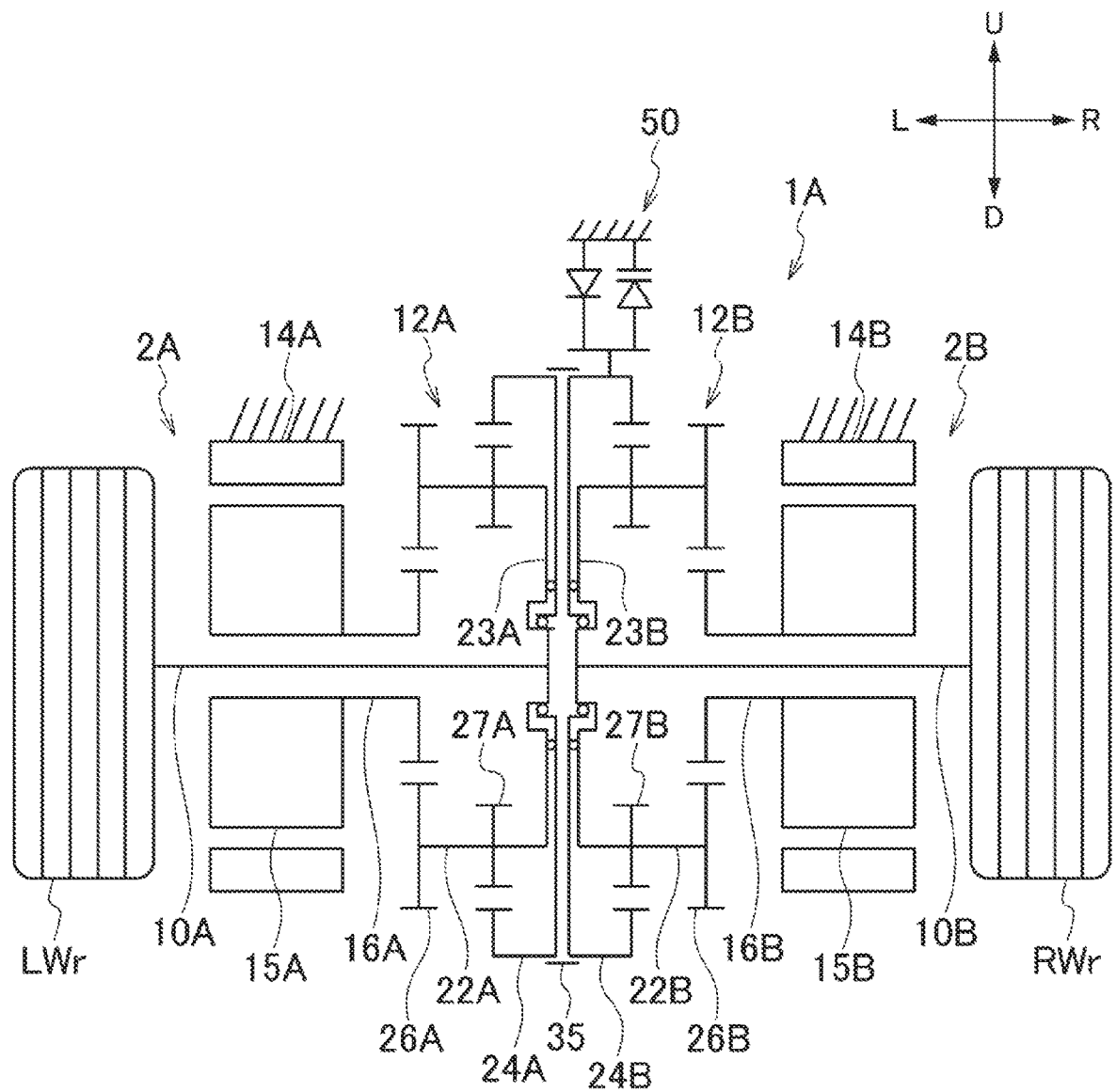
FIG. 12 is a skeleton diagram of a second embodiment of the rear-wheel driving device.
Figure 13:
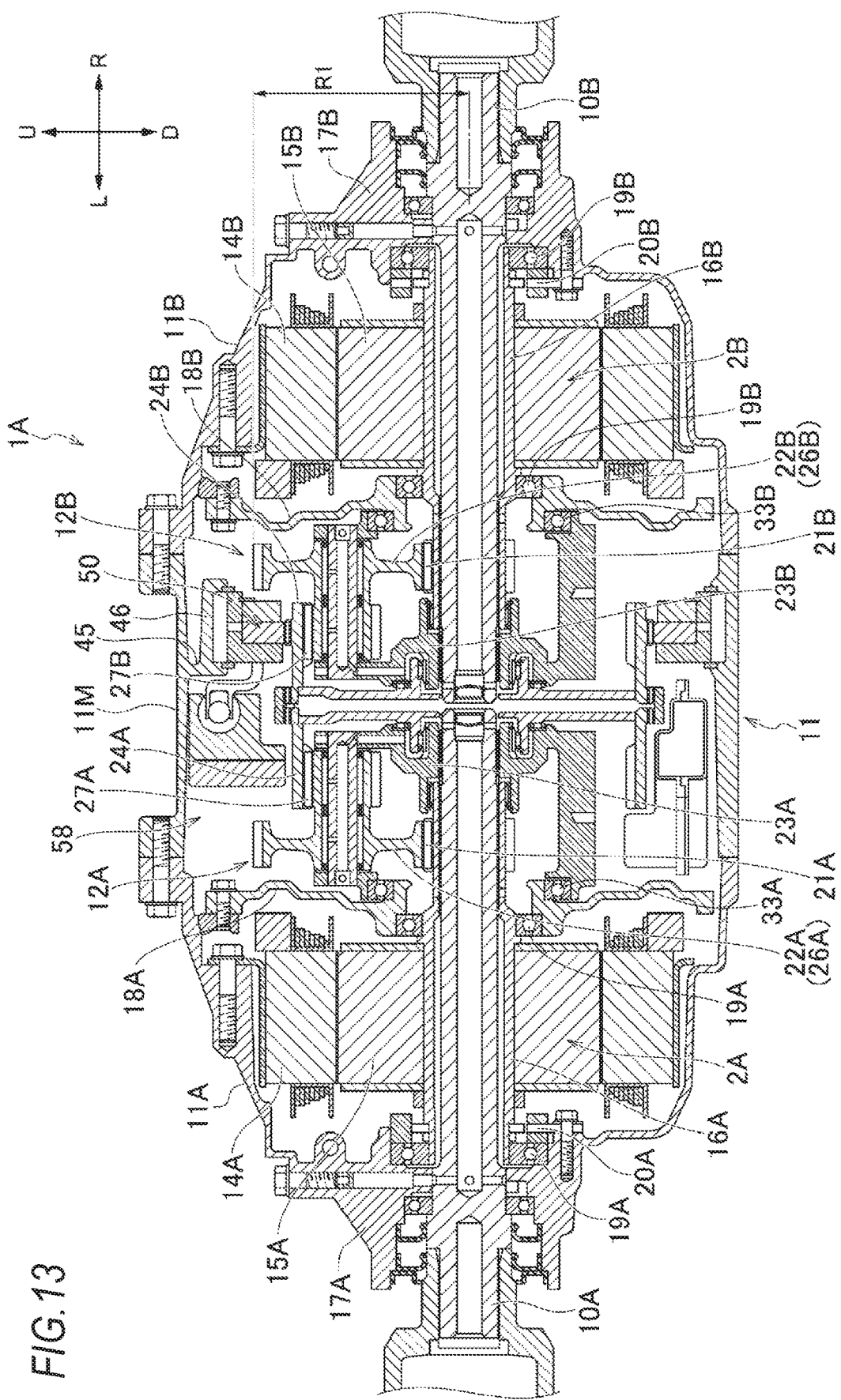
FIG. 13 is a longitudinal cross-sectional view of the second embodiment of the rear-wheel driving device.
Figure 14:
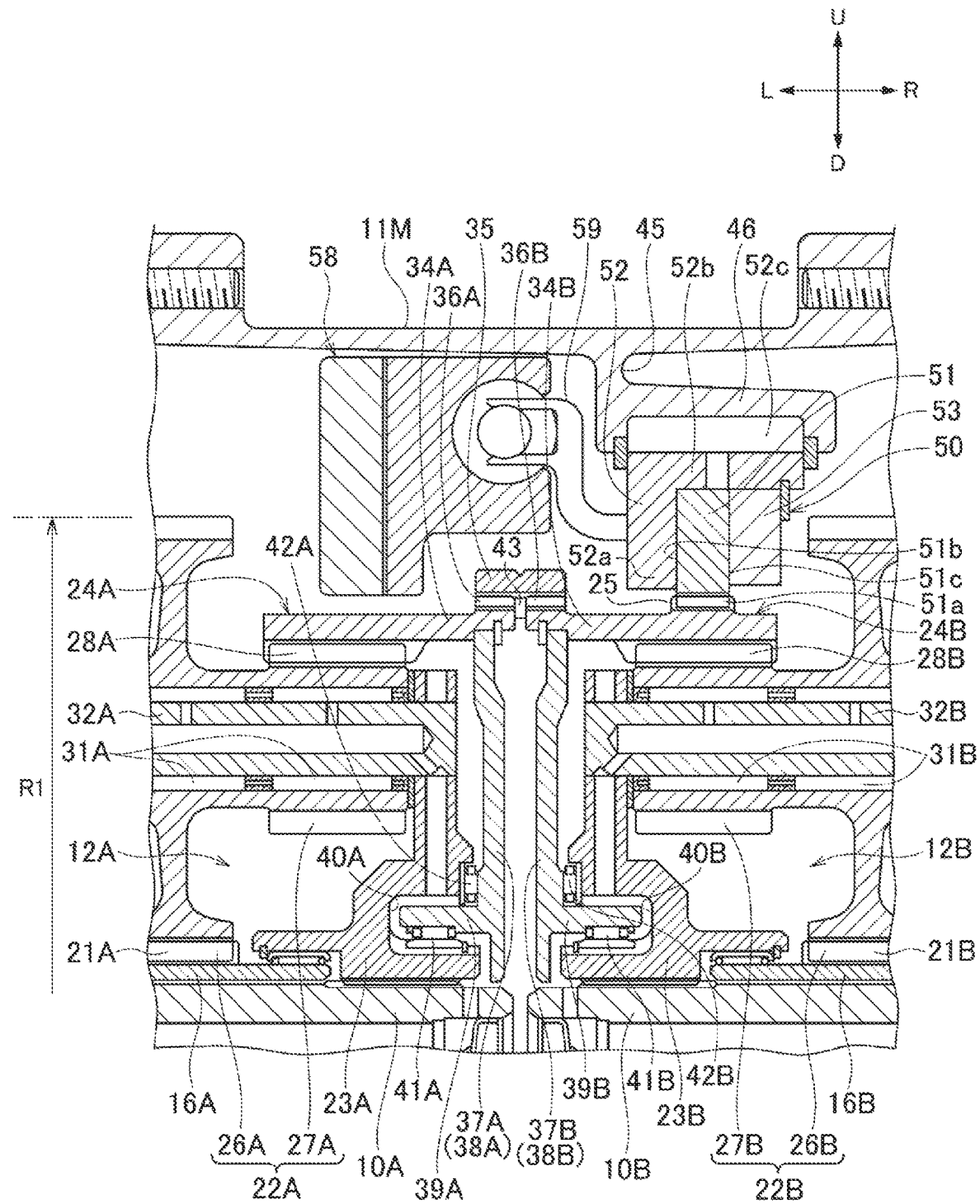
FIG. 14 is a partially enlarged view of the rear-wheel driving device illustrated in FIG. 13.
Figure 15:
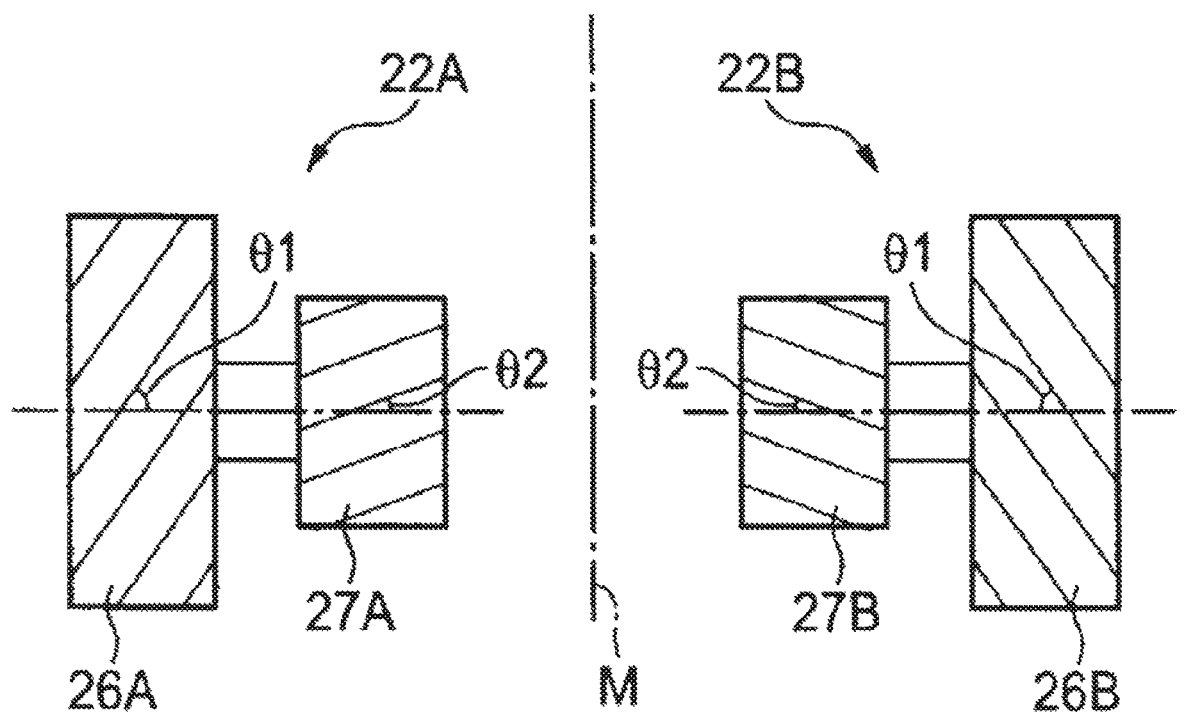
FIG. 15 is a schematic view for explaining twisting directions of meshing teeth of a first pinion and a second pinion of a planetary gear.

The rear-wheel driving device 1A of a second embodiment illustrated in FIGS. 12 to 14 differs from the above-described embodiment in that the two-way clutch 50 constituting the first one-way clutch OWC1, the switching unit SLC, and the second one-way clutch OWC2 is disposed on the second planetary-gear-type speed reducer 12B side in the vehicle width direction and on the outer diameter side of the second planetary-gear-type speed reducer 12B in the radial direction.

In the rear-wheel driving device 1A of the second embodiment, the cylindrical wall 46 formed at an inner-diameter-side end portion of the left and right separation wall 45 of the central case 11M is disposed so as to be offset from the middle position of the central case 11M toward the second planetary-gear type speed reducer 12B.

The ring gears 24A and 24B include the gear portions 28A and 28B of which the inner circumferential surfaces mesh with the second pinions 27A and 27B having a small diameter, connecting portions 34A and 34B which extend inward in the vehicle width direction from the gear portions 28A and 28B and are disposed so as to face each other at the middle position of the case 11, splines 36A and 36B which are formed on the outer circumferential surfaces of the connecting portions 34A and 34B, and inward flange portions 37A and 37B which extend radially inward from the inner-side end portions of the connecting portions 34A and 34B.

In the inward flange portions 37A and 37B, disk-shaped flange main bodies 38A and 38B of which the outer-diameter-side end portions are connected to the connecting portions 34A and 34B and support portions 39A and 39B which extend in directions away from each other in the vicinities of the inner-diameter-side end portions of the flange main bodies 38A and 38B are provided. In the inward flange portions 37A and 37B, the support portions 39A and 39B are rotatably supported in cylindrical space portions 40A and 40B recessed in the planetary carriers 23A and 23B via radial bearings 41A and 41B and the flange main bodies 38A and 38B are rotatably supported by planetary carriers 23A and 23B via thrust bearings 42A and 42B.

The splines 36A and 36B of the connecting portions 34A and 34B are spline-fitted to the inner circumferential surface of a connecting member 35 having a cylindrical shape. As a result, the ring gears 24A and 24B are coupled to each other so as to rotate integrally. The connecting portions 34A and 34B are arranged to face each other via a circlip 43 held on the inner circumferential surface of the connecting member 35 and it is configured such that the connecting portions 34A and 34B push each other through the circlip 43 when force is applied to the ring gears 24A and 24B in a direction where the ring gears 24A and 24B approach each other. That is, the abutment position of the ring gears 24A and 24B is located at the substantially same diameter positions as the meshing position between the ring gear 24A of the first planetary-gear-type speed reducer 12A and the second pinion 27A of the planetary gear 22A and the meshing position between the ring gear 24B of the second planetary-gear-type speed reducer 12B and the second pinion 27B of the planetary gear 22B. The substantially same diameter position is not limited to a case where radial positions are completely identical and however it is a concept including a difference in the meshing positions between a meshing element (the gear teeth in this embodiment) provided on the inner circumferential surface of the cylindrical member constituting the gear portions 28A and 28B and the connecting portions 34A and 34B and a meshing element (spline teeth) provided on the outer circumferential surface thereof, as in the invention.

On the radially outer side and above the ring gear 24B, the left and right separation wall 45 extends radially inward from the central case 11M and the cylindrical wall 46 is formed on the inner-diameter-side end portion of the left and right separation wall 45 so as to extend toward the second electric motor 2B side. A space portion is secured between the ring gear 24B and the cylindrical wall 46 facing each other in the radial direction and the two-way clutch 50 is disposed in the space portion. A spline 25 formed on the outer circumferential surface of the ring gear 24B is spline-fitted to the inner circumferential portion of the rotating plate 51 of the two-way clutch 50. Further, the inner circumferential portion of the cylindrical wall 46 is spline-fitted to the outer circumferential portion of the first fixing plate 52 of the two-way clutch 50. As a result, the first fixing plate 52 of the two-way clutch 50 is positioned by the central case 11M and is prevented from rotating.

Here, the meshing of the planetary gears 22A and 22B will be described.

In the planetary gears 22A and 22B, twist directions of the meshing teeth of the first pinions 26A and 26B having a large diameter and engaged with the sun gears 21A and 21B and the second pinions 27A and 27B having a small diameter are in the same direction, as illustrated in FIG. 12, and thus thrust forces which are generated in the first pinions 26A and 26B having the large diameter and the second pinions 27A and 27B having the small diameter due to the twist are opposite to each other.

A helix angle θ1 of the first pinion 26A and 26B having a large diameter and meshed with the sun gears 21A and 21B is set to be greater than a helix angle θ2 of the second pinions 27A and 27B having a small diameter and meshed with the gear portions 28A and 28B of the ring gears 24A and 24B. Therefore, in the thrust forces generated in the planetary gears 22A and 22B, the thrust force in the second pinions 27A and 27B having a small diameter is greater than that of the first pinions 26A and 26B having a large diameter.

The planetary gear 22A of the first planetary-gear-type speed reducer 12A and the planetary gear 22B of the second planetary-gear-type speed reducer 12B are vertical with a straight line including the rotation axes of the first and second planetary-gear-type speed reducers 12A and 12B and mirror-symmetry with respect to an intermediate plane M located between the first and second planetary-gear-type speed reducers 12A and 12B, and further, the helix angles θ1 and θ2 of the meshing teeth are mirror symmetrical in the same manner. Therefore, in the planetary gear 22A and the planetary gear 22B, when the input torques from the first and second electric motors 2A and 2B are equal, the thrust forces generated in the meshing portions of the second pinions 27A and 27B are mirror-symmetrical with respect to the intermediate plane M and the thrust forces acting on the ring gears 24A and 24B are also mirror-symmetrical with respect to the intermediate plane M. The arrows (thin arrows) illustrated in FIGS. 16A to 18B to be described below indicate the thrust forces acting on the ring gears 24A and 24B.

[Arrangement in Rear-Wheel Driving Device]

As illustrated in FIG. 13, in the rear-wheel driving device 1, the first electric motor 2A and the first planetary-gear-type speed reducer 12A are arranged in this order from the left outer side in the vehicle width direction and the second electric motor 2B and the second planetary-gear-type speed reducer 12B are arranged in this order from the right outer side in the vehicle width direction. Further, the two-way clutch 50 constituting the first one-way clutch OWC1, the second one-way clutch OWC2, and the switching unit SLC is disposed radially outside the ring gear 24B of the second planetary-gear-type speed reducer 12B. At least a part of the two-way clutch 50 is arranged further on an inner side than the outermost diameter portion R1 of the second planetary-gear-type speed reducer 12B.

In addition, the actuator 58 for switching the selector plate 54 is arranged on the outer diameter side and above the ring gear 24A of the first planetary-gear-type speed reducer 12A. At least a part of the actuator 58 is arranged further on an inner side than the outermost diameter portion R1 of the first planetary-gear-type speed reducer 12A.

[Bending Moment]

Hereinafter, the bending moments acting on the ring gears 24A and 24B of the rear-wheel driving device 1A of the second embodiment will be described in comparison with the bending moment acting on the ring gears 24A and 24B of the driving device 1 of the first embodiment with reference to FIGS. 16A to 18B.

[Bending Moment during Rear-Wheel Drive]

Figure 16A:
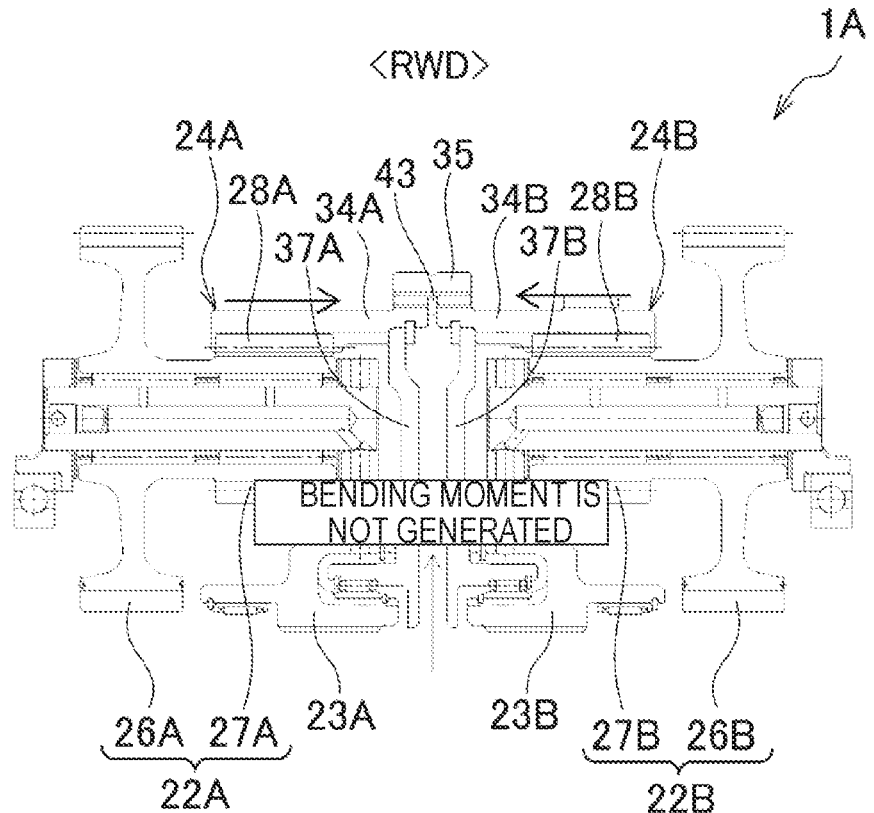
FIG. 16A is a view for explaining a bending moment at the time of forward travelling of the vehicle and power-running driving of the first and second electric motors in the rear-wheel driving device according to the second embodiment.

In the rear-wheel driving device 1A of the second embodiment and the rear-wheel driving device 1 of the first embodiment, when, during the rear-wheel drive illustrated in FIG. 8, the first and second electric motors 2A and 2B are driven in a power running manner so that the first and second electric motors 2A and 2B rotate in the forward direction, forces act on the gear portions 28A and 28B in directions approaching each other from the relationship of the helix angles of the meshing teeth of the planetary gears 22A and 22B. In the rear-wheel driving device 1A of the second embodiment, as illustrated in FIG. 16A, the abutment position of the ring gears 24A and 24B is located at the substantially same diameter positions as the meshing position between the ring gear 24A of the first planetary-gear-type speed reducer 12A and the second pinion 27A of the planetary gear 22A and the meshing position between the ring gear 24B of the second planetary-gear-type speed reducer 12B and the second pinion 27B of the planetary gear 22B, and thus neither of the inward flange portions 37A and 37B generates a bending moment. In addition, forces acting on the ring gears 24A and 24B in directions approaching each other are canceled by pushing each other through the circlip 43.

On the contrary, in the rear-wheel driving device 1 of the first embodiment, the abutment positions of the ring gears 24A and 24B are located further on a radially inner side than the meshing position between the ring gear 24A of the first planetary-gear-type speed reducer 12A and the second pinion 27A of the planetary gear 22A and the meshing position between the ring gear 24B of the second planetary-gear-type speed reducer 12B and the second pinion 27B of the planetary gear 22B. Therefore, as indicated by the thick arrow in FIG. 16B, bending moments are generated in the connecting portions 30A and 30B so as to rotate the gear portions 28A and 28B in directions approaching each other about the vicinities of the connection portions between the small diameter portions 29A and 29B and the connecting portions 30A and 30B as fulcrums.

As described above, in the rear-wheel driving device 1A of the second embodiment, it is possible to suppress the generation of the bending moments in the inward flange portions 37A and 37B of the ring gears 24A and 24B during the frequently used rear-wheel drive. Therefore, the weight of the inward flange portions 37A and 37B can be reduced.

[Bending Moment during Decelerating Regenerative Travelling]

When, during the decelerating regenerative travelling illustrated in FIG. 10, the first and second electric motors 2A and 2B are regeneratively driven so that the torque in the reverse direction is generated in the first and second electric motors 2A and 2B, from the relationship of the helix angles of the meshing teeth of the planetary gears 22A and 22B, forces act on the gear portions 28A and 28B in directions away from each other and forces also act on the ring gears 24A and 24B in directions away from each other. In the rear-wheel driving device 1A of the second embodiment, as indicated by the thick arrow in FIG. 17A, bending moments are generated in the inward flange portions 37A and 37B so as to rotate the gear portions 28A and 28B in directions away from each other about the vicinities of the contact portions between the flange main bodies 38A and 38B and the thrust bearings 42A and 42B as fulcrums.

Figure 17A:
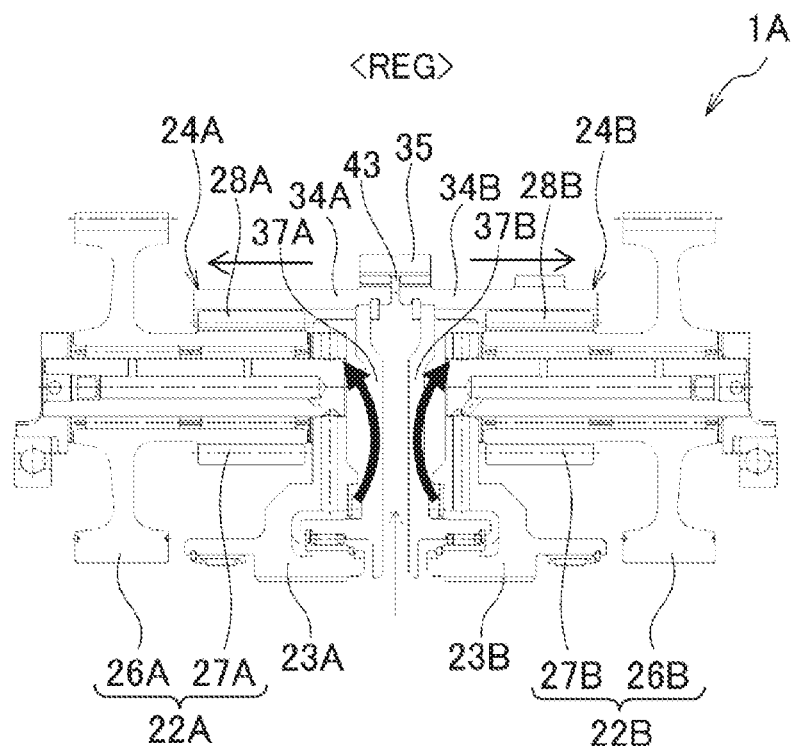
FIG. 17A is a view for explaining a bending moment at the time of forward travelling of the vehicle and regenerative driving of the first and second electric motors in the rear-wheel driving device according to the second embodiment.
Figure 17B:
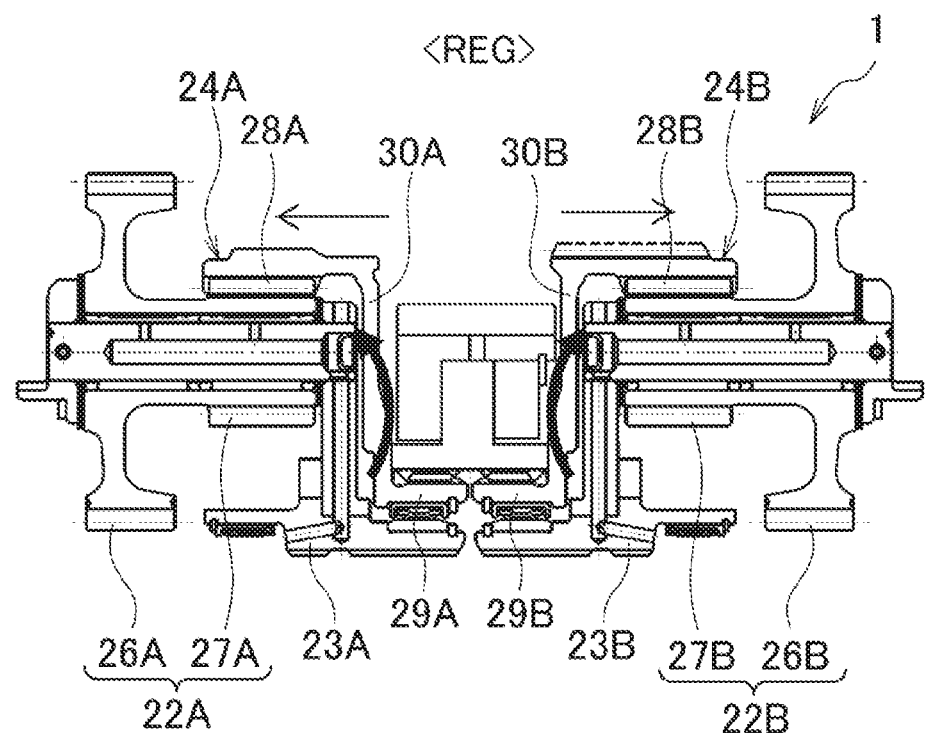
FIG. 17B is a view for explaining a bending moment at the time of forward travelling of the vehicle and regenerative driving of the first and second electric motors in the rear-wheel driving device according to the first embodiment.

In the rear-wheel driving device 1 of the first embodiment, as indicated by the thick arrow in FIG. 17B, bending moments are generated in the connecting portions 30A and 30B so as to rotate the gear portions 28A and 28B in directions away from each other about the vicinities of the contact portions between the connecting portions 30A and 30B and the thrust bearings 42A and 42B as fulcrums.

As described above, in the rear-wheel driving device 1A of the second embodiment, the bending moments are generated in the inward flange portions 37A and 37B of the ring gears 24A and 24B during decelerating regenerative travelling. However, during decelerating regenerative travelling in which the first and second electric motors 2A and 2B are regeneratively driven, the torque of the first and second electric motors 2A and 2B is smaller than that during the rear-wheel drive in which the first and second electric motors 2A and 2B are driven in a power running manner. Therefore, it is set so that the bending moment is not generated during the rear-wheel drive, thereby making it possible to reduce the weight of the inward flange portions 37A and 37B.

[Bending Moment during Turning Assist Travelling]

Figure 18A:
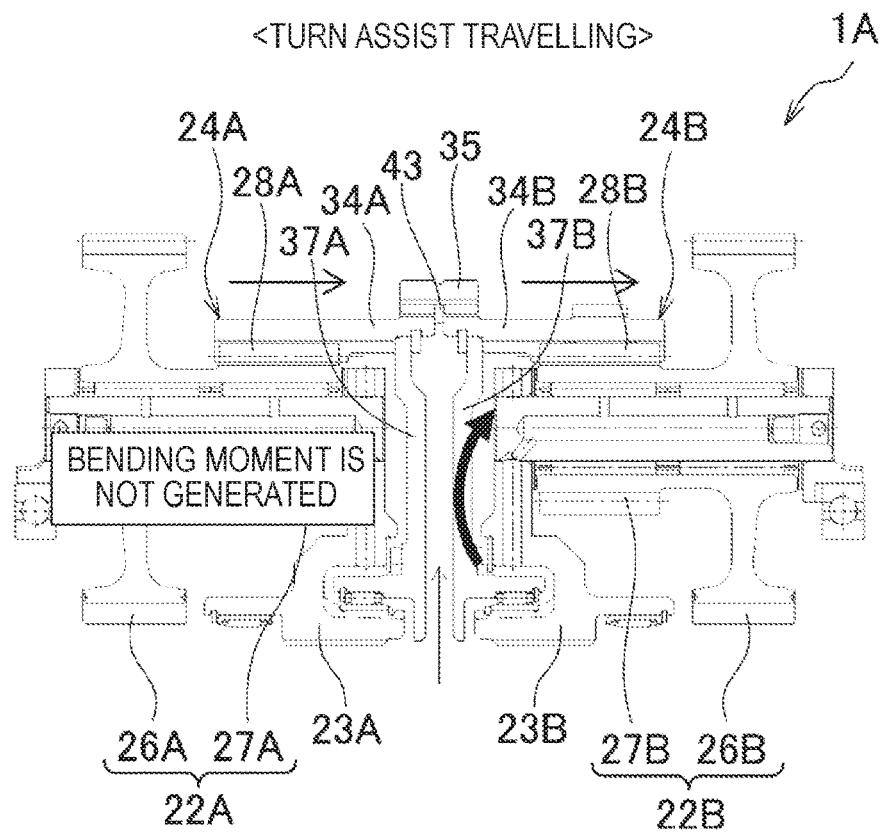
FIG. 18A is a view for explaining a bending moment at the time of forward travelling of the vehicle and turning control of the first and second electric motors in the rear-wheel driving device according to the second embodiment.
Figure 18B:
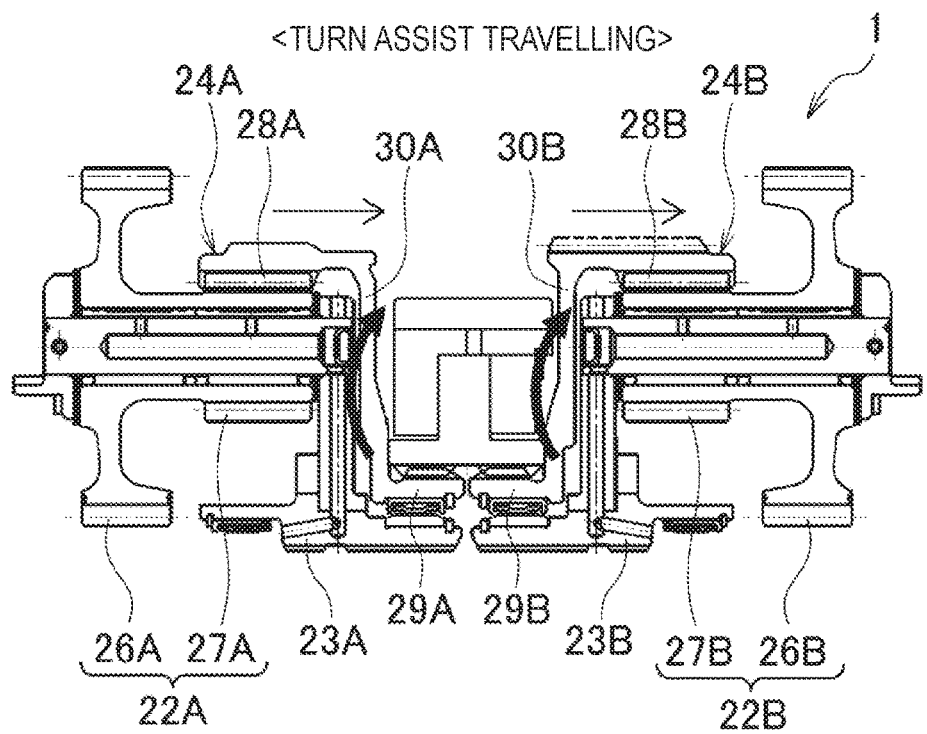
FIG. 18B is a view for explaining a bending moment at the time of forward travelling of the vehicle and turning control of the first and second electric motors in the rear-wheel driving device according to the first embodiment.
Figure 19:
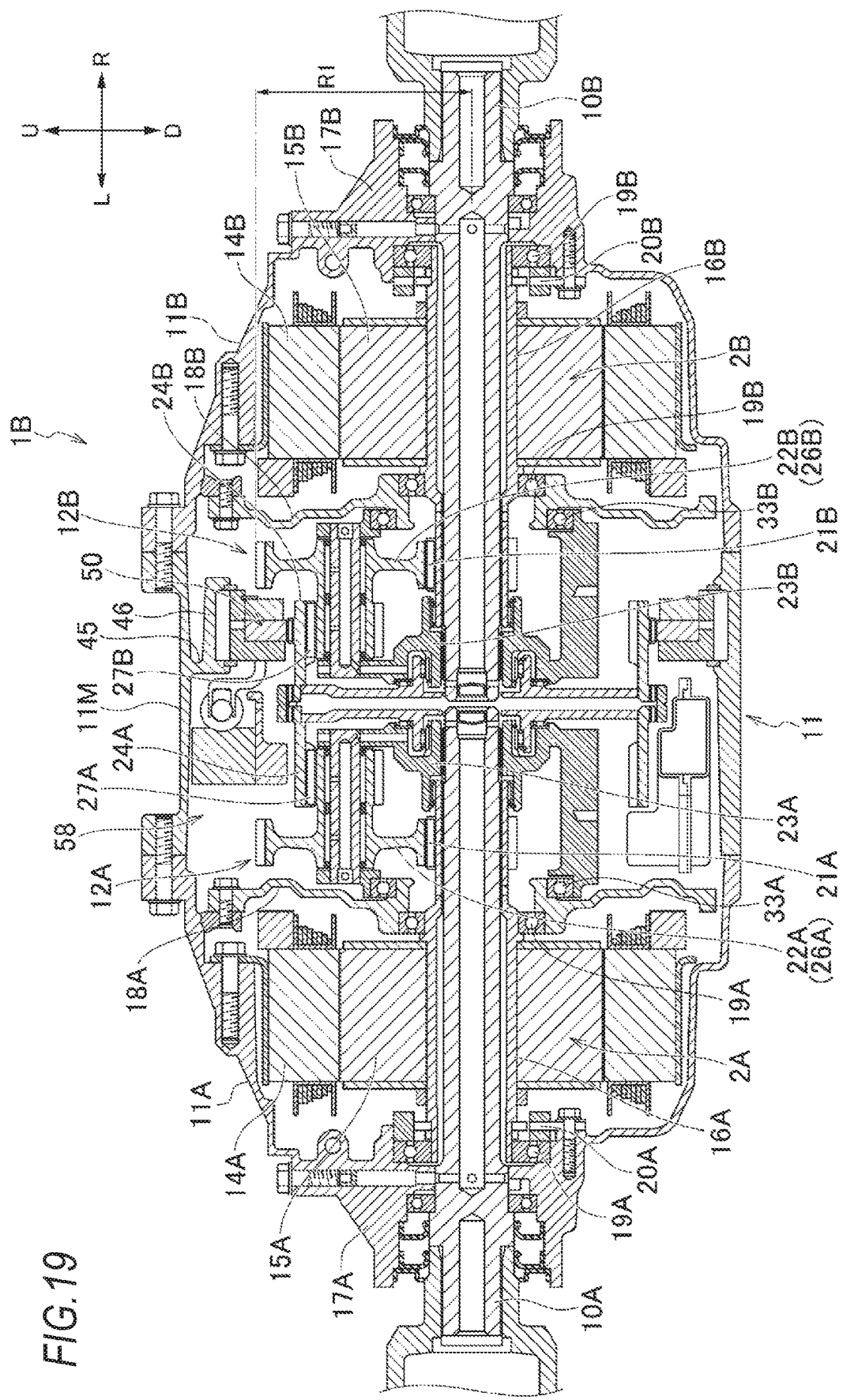
FIG. 19 is a longitudinal cross-sectional view of a third embodiment of the rear-wheel driving device.
Figure 20:
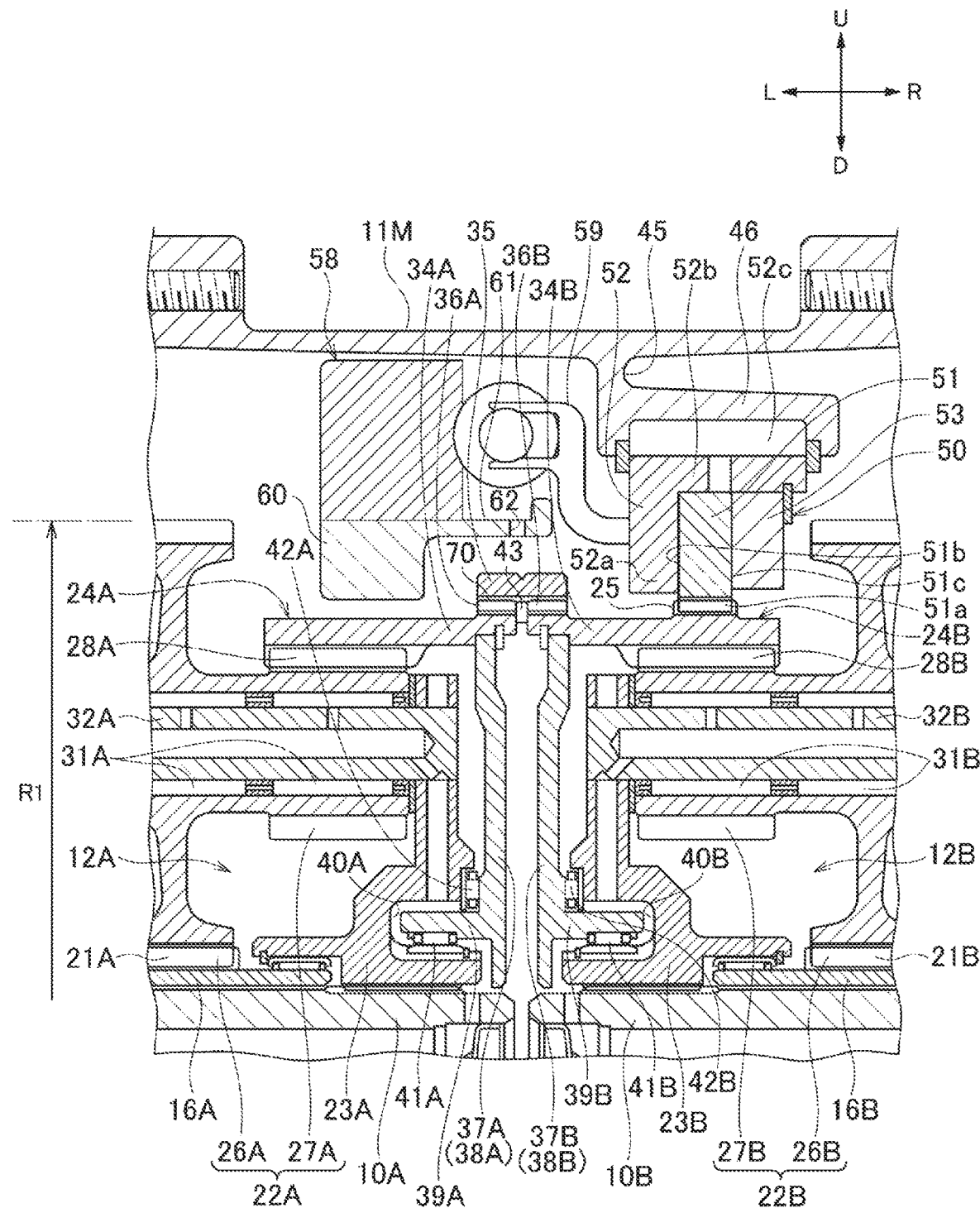
FIG. 20 is a partially enlarged view of the third embodiment of the rear-wheel driving device.
Figure 21:
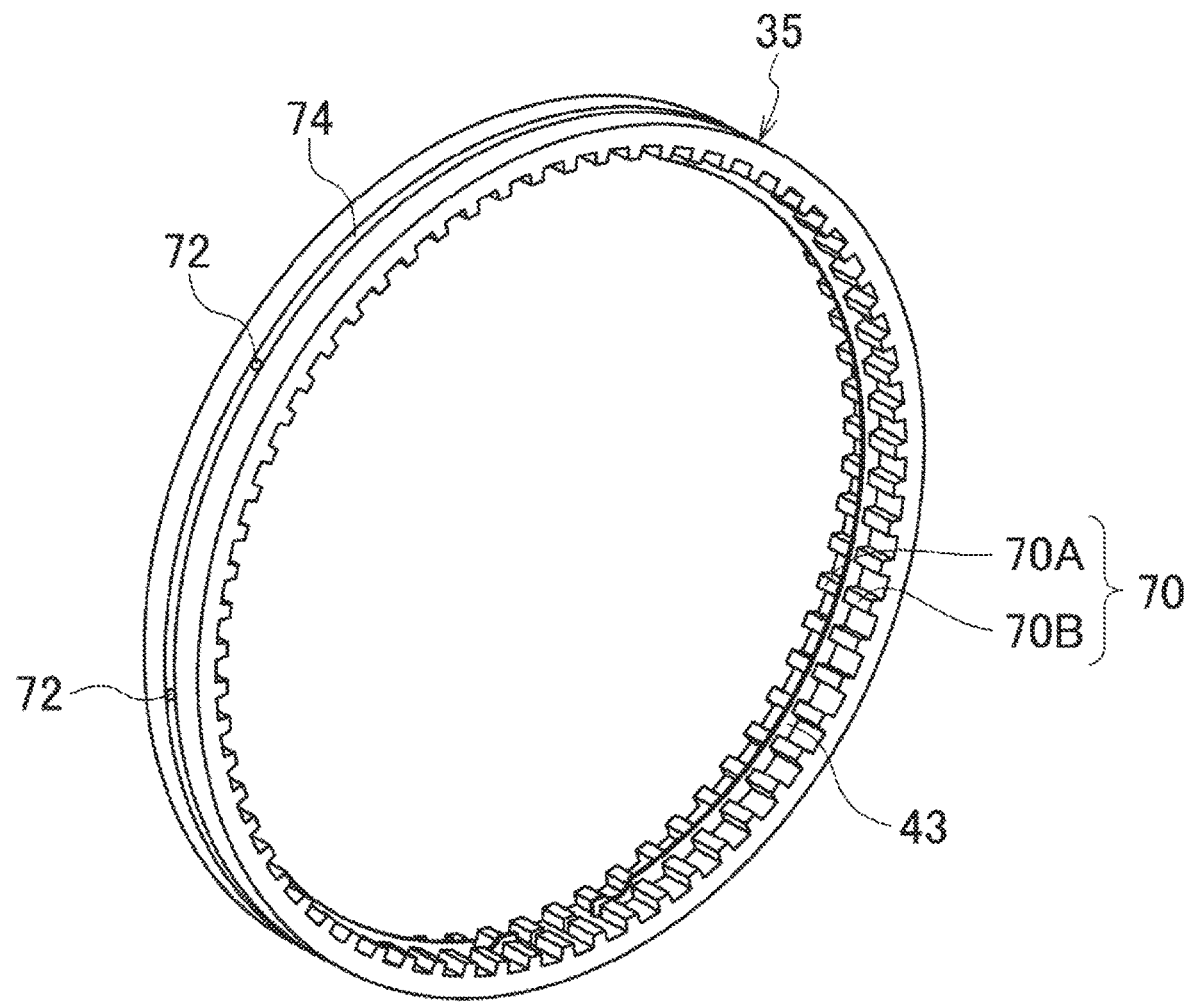
FIG. 21 is a perspective view of a connecting member.
Figure 22:
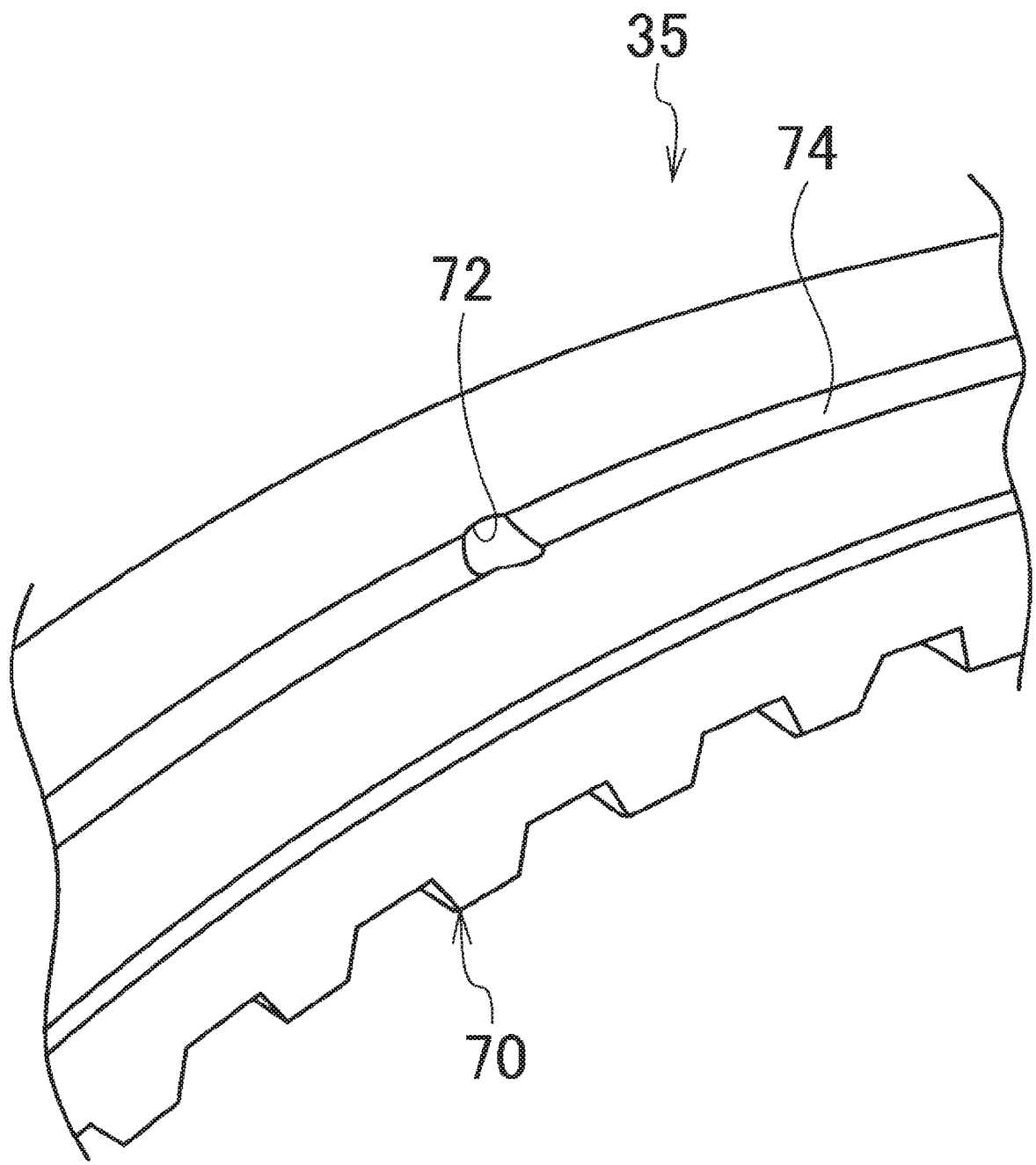
FIG. 22 is a partially enlarged perspective view of an outer circumferential surface of the connecting member.

Next, bending moments generated in the ring gears 24A and 24B during the turning assist travelling will be described with reference to FIGS. 18A and 18B. The turning assist travelling is a mode in which, when a vehicle is turning, one of the electric motors connected to the wheel serving as an outer wheel is driven in a power running manner and the other electric motor connected to the wheel serving as an inner wheel is regeneratively driven to generate a rotational moment in a vehicle, in such a manner that steering properties during turning are improved. Further, in FIGS. 18A and 18B, turning assist travelling during turning right in which the first electric motor 2A is driven in a power running manner and the second electric motor 2B is regeneratively driven is illustrated.

Figure 16B:
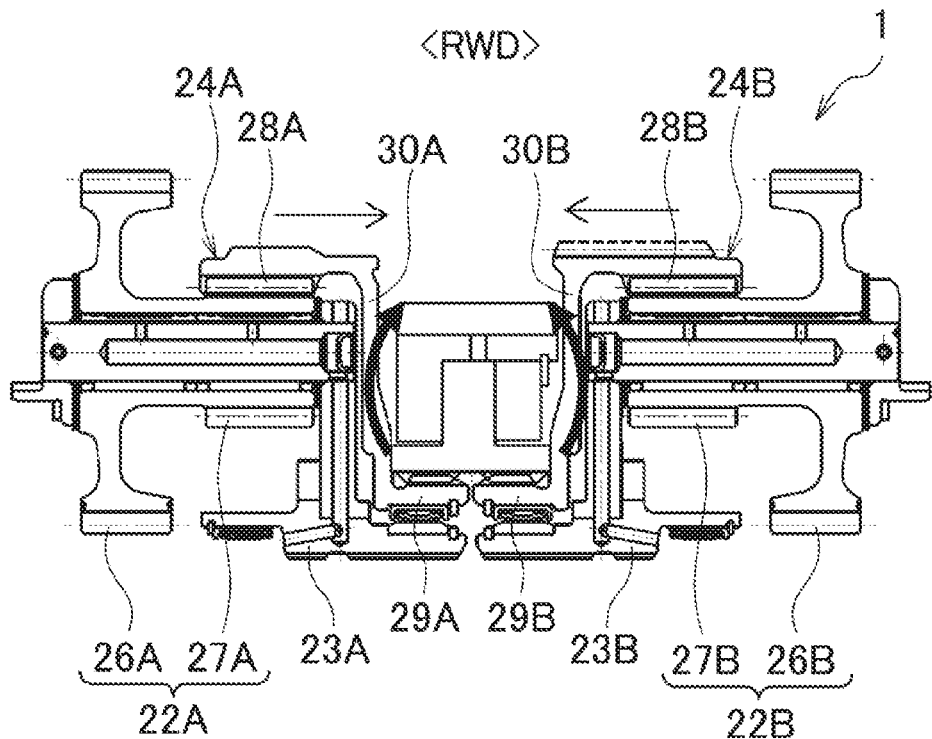
FIG. 16B is a view for explaining a bending moment at the time of forward travelling of the vehicle and power-running driving of the first and second electric motors in the rear-wheel driving device according to the first embodiment.

In the rear-wheel driving device 1A of the second embodiment and the rear-wheel driving device 1 of the first embodiment, when the first electric motor 2A is driven in a power running manner so that the first electric motor 2A rotates in the forward direction as illustrated in FIGS. 16A and 16B, a force acts on the gear portion 28A in a direction approaching the gear portion 28B in the drawings from the relationship of the helix angle of the meshing teeth of the planetary gear 22A and a force acts also on the ring gear 24A in a direction approaching the ring gear 24B. On the other hand, when the second electric motor 2B is regeneratively driven so that torque in the reverse direction is generated in the second electric motor 2B, as illustrated in FIGS. 17A and 17B, a force acts on the gear portion 28B in a direction away from the gear portion 28A from the relationship of the helix angle of the meshing teeth of the planetary gear 22B and a force also acts on the ring gear 24B in a direction away from the ring gear 24A. That is, as illustrated in FIGS. 18A and 18B, the forces act on both the ring gear 24A and 24B to be directed to the second electric motor 2B.

In this case, in the rear-wheel driving device 1A of the second embodiment, no bending moment is generated in the inward flange portion 37A, as illustrated in FIG. 16A. On the other hands, as illustrated in FIG. 17A, the bending moment which causes the gear portion 28B to rotate in the direction away from the gear portion 28A about the vicinity of the contact portion between the flange main body 37B and the thrust bearing 42B as a fulcrum is generated in the inward flange portion 37B (see FIG. 18A).

On the contrary, in the rear-wheel driving device 1 of the first embodiment, as illustrated in FIG. 16B, the bending moment which causes the gear portion 28A to rotate in the direction approaching the gear portion 28B about the vicinity of the connection portion between the small diameter portion 29B and the connecting portion 30B as a fulcrum is generated in the connecting portion 30A. On the other hand, as illustrated in FIG. 17B, the bending moment which causes the gear portion 28B to rotate in a direction away from the gear portion 28A about the vicinity of the contact portion between the connecting portion 30B and the thrust bearing 42B as a fulcrum is generated in the connecting portion 30B (see FIG. 18B).

As described above, in the rear-wheel driving device 1A of the second embodiment, it is possible to suppress the generation of the bending moment in the inward flange portion 37A of the ring gear 24A during the turning assist travelling in the right turn. Further, although the description is omitted, it is possible to suppress the generation of the bending moment in the inward flange portion 37B of the ring gear 24B during the turning assist travelling in the left turn.

As described above, according to the embodiment, the second one-way clutch OWC2 capable of mechanically transmitting the reverse torque on the side of the first and second electric motors 2A and 2B toward the rear wheel Wr is provided. Therefore, it is possible to reduce the fastening energy of the brake unit, which is necessary in the related art when (for example, during rearward travelling) the reverse torque on the side of the first and second electric motors 2A and 2B is transmitted to the rear wheel Wr.

Furthermore, the second one-way clutch OWC2 can mechanically transmit the forward rotational power on the side of the rear wheel Wr toward the first and second electric motors 2A and 2B. Therefore, it is possible to reduce the fastening energy of the brake unit, which is necessary in the related art when (for example, during decelerating regenerative travelling) the forward rotational power on the side of the rear wheel Wr is transmitted to the first and second electric motors 2A and 2B.

Further, in the power transmission path in which the second one-way clutch OWC2 is provided, the switching unit SLC for bringing the power transmission path into the interrupted state or the connection-permitted state is provided in series. Therefore, in a situation (for example, during the forward high-speed travelling) in which it is undesirable to transmit the forward rotational power of the rear wheel Wr side to the first and second electric motors 2A and 2B side, mechanical power transmission by the second one-way clutch OWC2 can be interrupted.

In addition, the abutment position where the ring gears 24A of the first planetary-gear-type speed reducer 12A and the ring gear 24B of the second planetary-gear-type speed reducer 2B directly or indirectly abut on each other is located at the substantially same diameter position as the meshing position between the ring gear 24A of the first planetary-gear-type speed reducer 12A and the planetary gear 22A of the first planetary-gear-type speed reducer 12A and the meshing position between the ring gear 24B of the second planetary-gear-type speed reducer 2B and the planetary gear 22B of the second planetary-gear-type speed reducer 2B. Therefore, in each of the first and second planetary-gear-type speed reducers 12A and 12B, it is possible to suppress the generation of the bending moments in the inward flange portions 37A and 37B due to the forces generated by meshing of the ring gears 24A and 24B and the planetary gears and 22B. Therefore, the weight of the inward flange portions 37A and 37B can be reduced. In addition, since it is possible to prevent that the meshing portion is inclined by the bending moment, favorable tooth contact can be obtained even at large torque, and thus vibration properties are improved.

In the first and second planetary-gear-type speed reducers 12A and 12B, the meshing portions between the ring gears 24A and 24B and the planetary gears 22A and 22B are formed such that forces act in the directions in which the first and second planetary-gear-type speed reducers 12A and 12B approach each other when rotational power in one direction of the first and second electric motors 2A and 2B side is input to the rear wheel Wr (RWr and LWr) side. Therefore, it is possible to cancel the forces generated at the time of meshing of the ring gears 24A and 24B and the planetary gears 22A and 22B.

Further, the first and second planetary-gear-type speed reducers 12A and 12B are formed such that, when the rotational power of the first and second electric motors 2A and 2B side at the time of forward travelling is input to the rear wheel Wr (RWr and LWr) side, force is applied in a direction where the first and second planetary-gear-type speed reducers 12A and 12B approach each other. Generally, the driving torque when the vehicle moves forward is larger than the regenerative torque when regeneration is performed. Therefore, if there is no bending moment in the ring gears 24A and 24B which is generated when the vehicle moves forward, the weight of the ring gears 24A and 24B can be reduced.

Further, the first one-way clutch OWC1, the second one-way clutch OWC2, and the switching unit SLC are arranged on either one side of the first planetary-gear-type speed reducer 12A or the second planetary-gear-type speed reducer 2B in the vehicle width direction and on the radially outer side, and thus it is possible to suppress an increase in the size in the vehicle width direction due to the arrangement of the first one-way clutch OWC1, the second one-way clutch OWC2, and the switching unit SLC.

Third Embodiment

A rear-wheel driving device 1B of a third embodiment illustrated in FIGS. 19 to 23B is different from the second embodiment described above in that it has a lubricating mechanism for lubricating a fitting portion between the ring gear 24A of the first planetary-gear-type speed reducer 12A and the ring gear 24B of the second planetary-gear-type speed reducer 12B, and the connecting member 35.

In the rear-wheel driving device 1B of the third embodiment, the actuator 58 is held by an actuator holding portion 60 disposed on the outer diameter side and the upper side of the ring gear 24A of the first planetary-gear-type speed reducer 12A. In the actuator holding portion 60, an oil reservoir 61 for storing an oil such as ATF (hereinafter, also referred to as a lubricating oil) circulating the rear-wheel driving device 1 is integrally provided above the connecting member 35.

[Connecting Member]

As illustrated in FIGS. 21 to 23B, in the connecting member 35, a connecting spline portion 70 which is fitted with the splines 36A and 36B formed on the outer circumferential surfaces of the connecting portions 34A and 34B of the ring gears 24A and 24B is formed on the inner circumferential surface. The connecting spline portion 70 has a left connecting spline portion 70A to be fitted with the spline 36A formed on the outer circumferential surface of the connecting portion 34A of the ring gear 24A, a right connecting spline portion 70B to be fitted with the spline 36B formed on the outer circumferential surface of the connecting portion 34B of the ring gear 24B, and an annular groove 71 for accommodating the circlip 43 arranged between the left connecting spline portion 70A and the right connecting spline portion 70B.

In the annular groove 71, a plurality of through holes 72 passing through the inner circumferential surface and the outer circumferential surface of the connecting member 35 are provided at a predetermined interval in the circumferential direction. In other words, the through hole 72 is disposed between the spline 36A formed on the outer circumferential surface of the connecting portion 34A of the ring gear 24A and the spline 36B formed on the outer circumferential surface of the connecting portion 34B of the ring gear 24B.

Figure 23A:
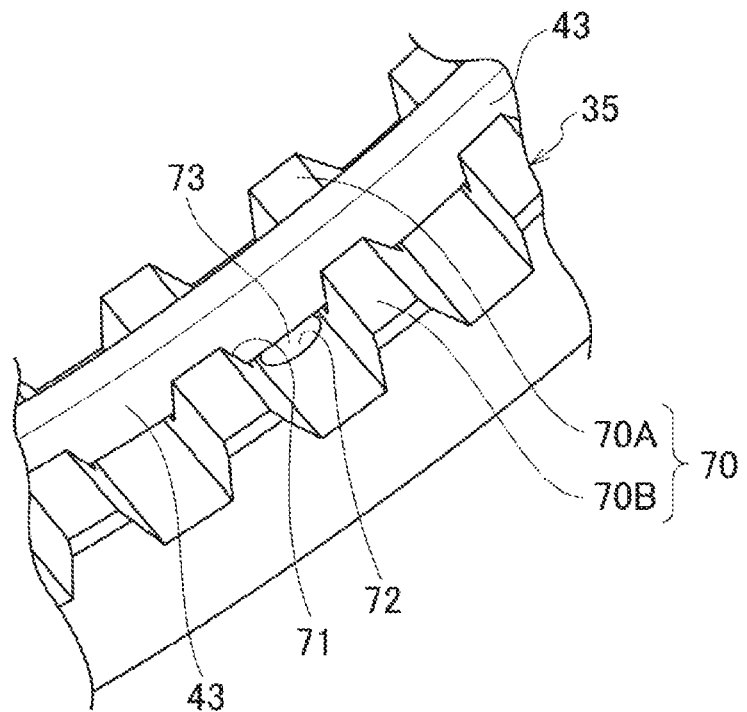
FIG. 23A is a partially enlarged perspective view of an inner circumferential surface of the connecting member in which a circlip is disposed.
Figure 23B:
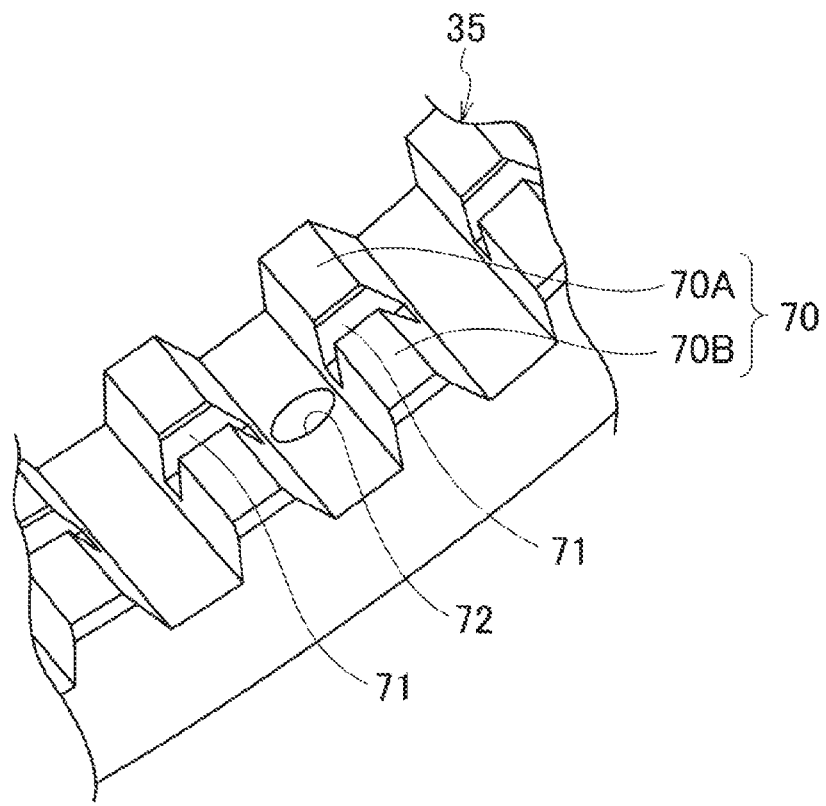
FIG. 23B is a partially enlarged perspective view of the inner circumferential surface of the connecting member with the circlip removed.

As illustrated in FIG. 23A, a gap 73 predetermined in the radial direction is provided between the circlip 43 disposed in the annular groove 71 and the through hole 72 so that the through hole 72 is not blocked by the circlip 43. A recessed groove 74 which has an annular shape and connects the plurality of through holes 72 is provided on the outer circumferential surface of the connecting member 35.

Returning to FIG. 20, an oil supply portion 62 is formed in the oil reservoir 61 at a position facing the recessed groove 74 formed on the outer circumferential surface of the connecting member 35 so that the oil stored in the oil reservoir 61 drips downward. Therefore, the oil dripped from the oil reservoir 61 flows into the through hole 72 through the recessed groove 74, and the oil passing through the through hole 72 is distributed to the left and right by the circlip 43. The oil distributed to the left and right by the circlip 43 is supplied to fitting portions between the ring gears 24A and 24B of the first and second planetary-gear-type speed reducers 12A and 12B and the connecting member 35.

As described above, according to the embodiment, the second one-way clutch OWC2 capable of mechanically transmitting the reverse torque of the first and second electric motors 2A and 2B side to the rear wheel Wr side is provided. Therefore, it is possible to reduce the fastening energy of a brake unit, which is necessary in the related art when (for example, during rearward travelling) the reverse torque of the first and second electric motors 2A and 2B side is transmitted to the rear wheel Wr side.

The second one-way clutch OWC2 can mechanically transmit the forward rotational power of the rear wheel Wr side to the first and second electric motors 2A and 2B side. Therefore, it is possible to reduce the fastening energy of the brake unit, which is necessary in the related art when (for example, during decelerating regenerative travelling) the forward rotational power of the rear wheel Wr side is transmitted to the first and second electric motors 2A and 2B side.

In the power transmission path in which the second one-way clutch OWC2 is provided, the switching unit SLC for bringing the power transmission path into the interrupted state or the connection-permitted state is provided in series. Therefore, in a situation (for example, during the forward high-speed travelling) in which it is undesirable to transmit the forward rotational power of the rear wheel Wr side to the first and second electric motors 2A and 2B side, mechanical power transmission by the second one-way clutch OWC2 can be interrupted.

Further, since the ring gear 24A of the first planetary-gear-type speed reducer 12A and the ring gear 24B of the second planetary-gear-type speed reducer 12B are connected to each other via the connecting member 35 fitted from the outer diameter side thereof and the connecting member 35 is provided with the through hole 72 passing through the inner circumferential surface and the outer circumferential surface, the lubricating oil can be supplied from the oil reservoir 61 provided above the connecting member 35 to the fitting portions between the ring gears 24A and 24B of the first and second planetary-gear-type speed reducer 12A and 12B, and the connecting member 35 via the through hole 72. In this manner, by supplying the lubricating oil from the outer circumferential portion of the connecting member 35 to the fitting portion, the lubrication path can be simplified.

By supplying the lubricating oil from the oil reservoir 61 provided above the connecting member 35 to the outer circumferential surface of the connecting member 35, a dedicated electric oil pump or the like is not necessary, and thus the manufacturing cost can be suppressed. Furthermore, the oil leaking from a hydraulic circuit can be used as the lubricating oil and it is possible to suppress supplying an excessive amount of oil to the fitting portion by adjusting the amount of oil leaking from the hydraulic circuit.

Since the through hole 72 is disposed between the spline 36A formed on the outer circumferential surface of the connecting portion 34A of the ring gear 4A and the spline 36B formed on the outer circumferential surface of the connecting portion 34B of the ring gear 24B, it is possible to appropriately supply the lubricating oil to both fitting portions.

Further, since the through hole 72 is the through hole 72 provided in the annular groove 71 accommodating the circlip 43 arranged between the left connecting spline portion 70A and the right connecting spline portion 70B, the lubricating oil supplied from the outer circumferential portion of the connecting member 35 passes through the through hole 72, and then the lubricating oil is distributed to the left connecting spline portion 70A side and the right connecting spline portion 70B side by the circlip 43. Thereby, the lubricating oil can be appropriately supplied to both fitting portions.

In addition, since a predetermined gap is provided between the circlip 43 and the through hole 72, the through hole 72 is prevented from being blocked by the circlip 43.

Since the recessed groove 74 connecting the plurality of through holes 72 is provided on the outer circumferential surface of the connecting member 35, the lubrication oil supplied from the outer circumferential portion of the connecting member 35 can be guided to the plurality of through holes 72 via the recessed groove 74.

In addition, the abutment position of the ring gears 24A and 24B is located at the substantially same diameter positions as the meshing position between the ring gear 24A of the first planetary-gear-type speed reducer 12A and the second pinion 27A of the planetary gear 22A and the meshing position between the ring gear 24B of the second planetary-gear-type speed reducer 12B and the second pinion 27B of the planetary gear 22B. Therefore, the connecting member 35 is positioned further on the outer diameter side, and thus the supply of the lubricating oil to the connecting member 35 becomes easier.

Fourth Embodiment

Figure 24:
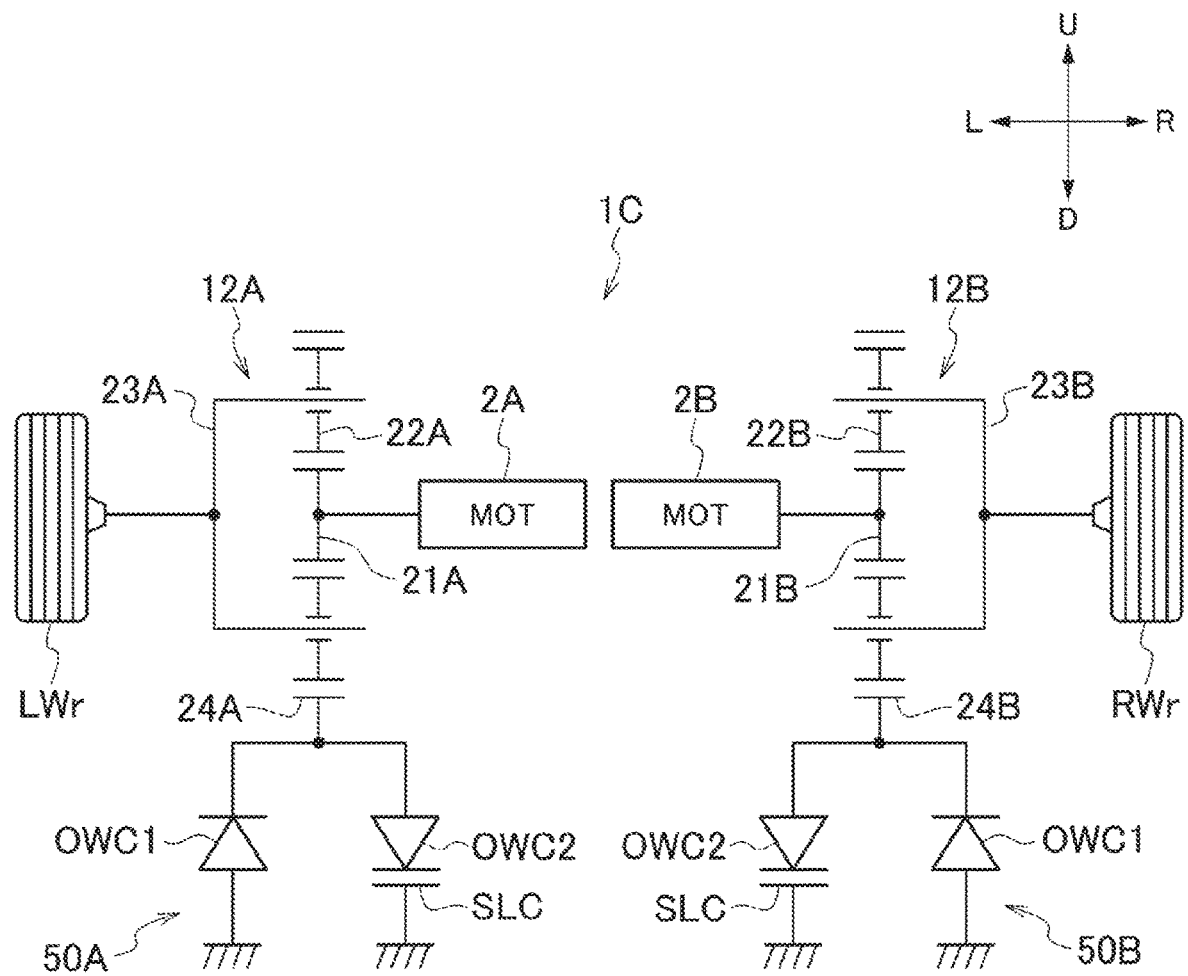
FIG. 24 is a skeleton diagram of a fourth embodiment of the rear-wheel driving device.

In a rear-wheel driving device 1C of a fourth embodiment illustrated in FIG. 24, the ring gears 24A and 24B of the first and second planetary-gear-type speed reducers 12A and 12B are not connected. Further, a first two-way clutch 50A is provided in the ring gear 24A of the first planetary-gear-type speed reducer 12A and a second two-way clutch 50B is provided in the ring gear 24B of the second planetary-gear-type speed reducer 12B. That is, the rear-wheel driving device 1C differs from the embodiments described above in that the speed change states of the first and second planetary-gear-type speed reducers 12A and 12B are individually controlled by the two two-way clutches 50A and 50B. The invention can also be applied to such a rear-wheel driving device 1C.

Fifth Embodiment

Figure 25:
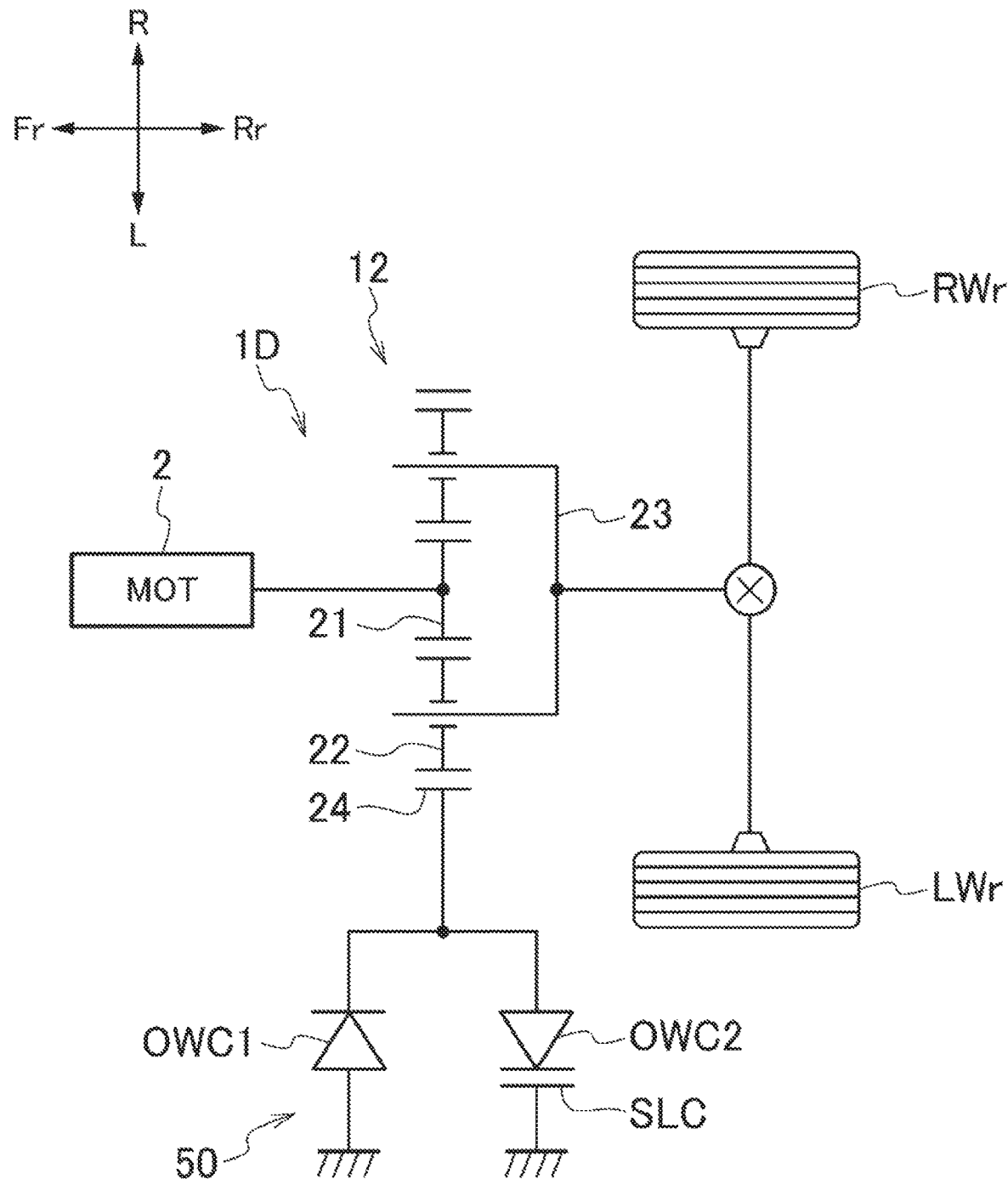
FIG. 25 is a skeleton diagram of a fifth embodiment of the rear-wheel driving device.

A rear-wheel driving device 1D of a fifth embodiment illustrated in FIG. 25 is different from the embodiments described above in that a group of the electric motor 2 and the planetary-gear-type speed reducers 12 drives the left and right rear wheels LWr and RWr. In the planetary-gear-type speed reducers 12, the electric motor 2 is connected to the sun gear 21 and the left and right rear wheels LWr and RWr are connected to the planetary carrier 23 supporting the planetary gear 22 to be rotatable and revolvable, and further, the two-way clutch 50 (the first one-way clutch OWC1, the switching unit SLC, and the second one-way clutch OWC2) is provided in the ring gear 24. The invention can also be applied to such a rear-wheel driving device 1D.

Sixth Embodiment

Figure 26:
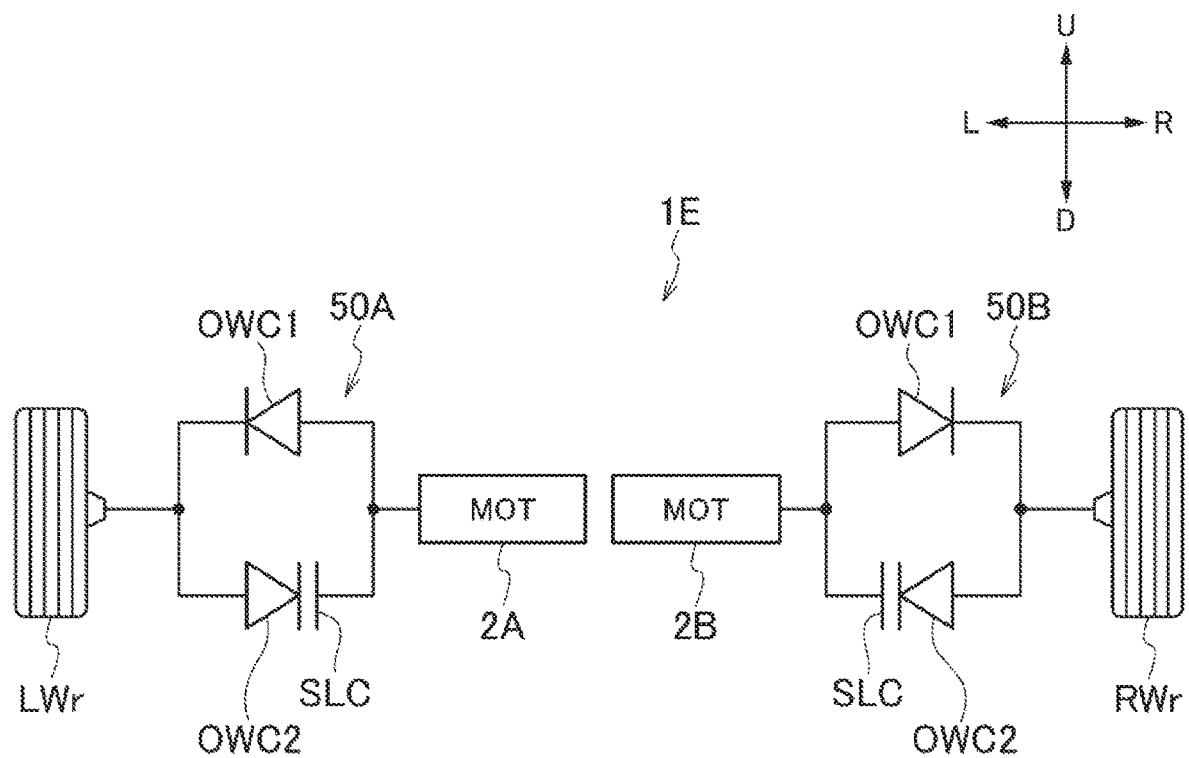
FIG. 26 is a skeleton diagram of a sixth embodiment of the rear-wheel driving device.

A rear-wheel driving device 1E of a sixth embodiment illustrated in FIG. 26 differs from the embodiments described above in that the rotational powers of the first and second electric motors 2A and 2B are respectively transmitted to the left and right rear wheels LWr and RWr without going through the planetary-gear-type speed reducers. In the rear-wheel driving device 1E, two-way clutches 50A and 50B (the first one-way clutches OWC1, the switching unit SLC, and the second one-way clutches OWC2) are respectively provided between the first and second electric motors 2A and 2B and the left and right rear wheels LWr and RWr. The invention can also be applied to such a rear-wheel driving device 1E.

Seventh Embodiment

Figure 27:
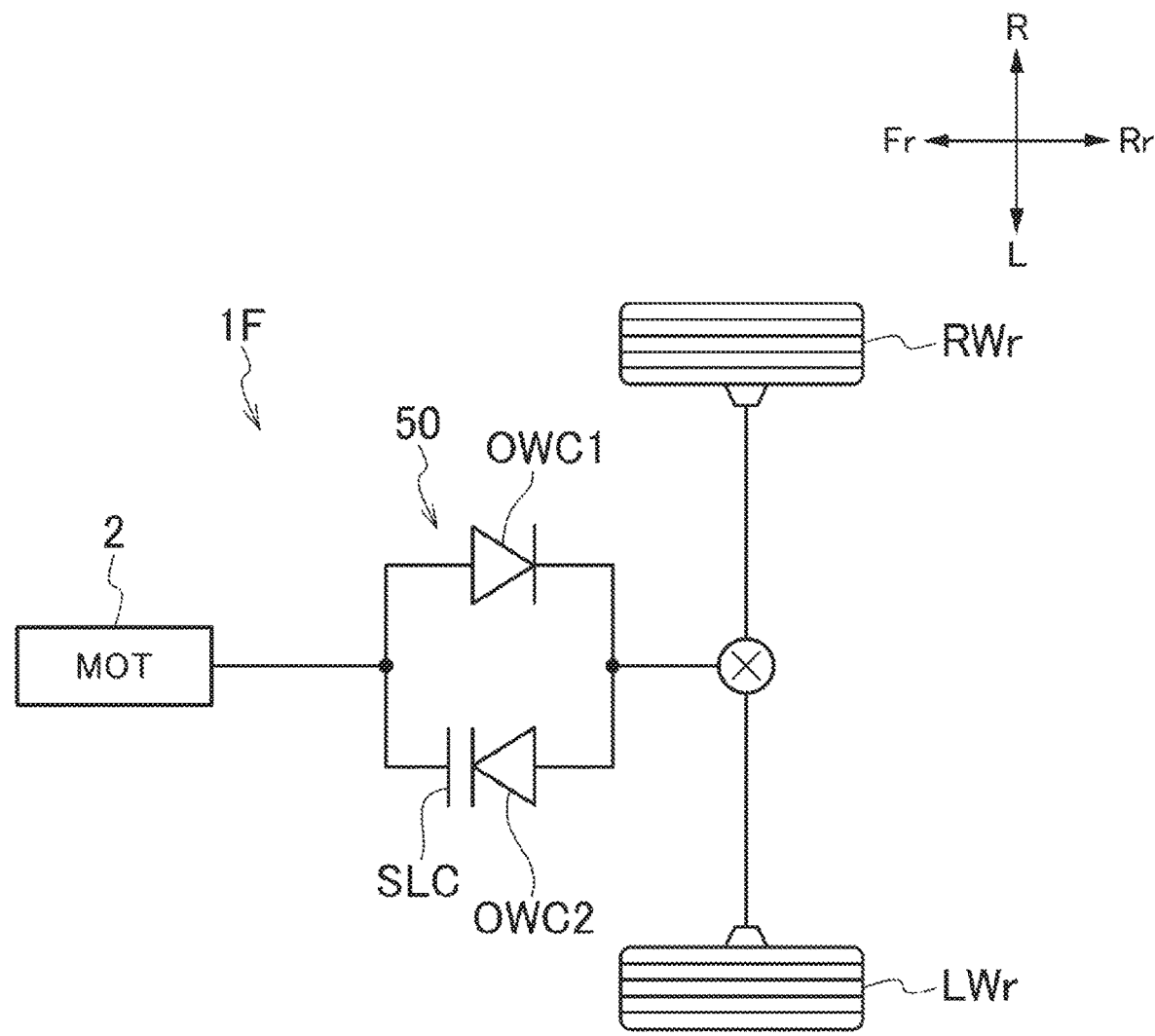
FIG. 27 is a skeleton diagram of the seventh embodiment of the rear-wheel driving device.

A rear-wheel driving device 1F of a seventh embodiment illustrated in FIG. 27 differs from the embodiments described above in that one electric motor 2 drives the left and right rear wheels LWr and RWr without going through a planetary-gear-type speed reducer. In the rear-wheel driving device 1F, the two-way clutch 50 (the first one-way clutch OWC1, the switching unit SLC, and the second one-way clutch OWC2) is provided between the electric motor 2 and the left and right rear wheels LWr and RWr. The invention can also be applied to such a rear-wheel driving device 1F.

The invention is not limited to the embodiments described above and may be appropriately modified, improved, and the like.

In the embodiment described above, for example, the first and second electric motors 2A and 2B are respectively connected to the sun gears 21A and 21B and the ring gears 24A and 24B are connected to each other, and further, the two-way clutch 50 is arranged on the connected ring gears 24A and 24B. However, the first and second electric motors 2A and 2B may be connected to the ring gears 24A and 24B respectively and the sun gears 21A and 21B may be connected to each other, and further, the two-way clutch 50 may be arranged on the connected sun gears 21A and 21B.

Further, although the driving device of the invention is described as being used for driving a rear wheel of a vehicle as an example, it may be used for driving a front wheel of a vehicle.

Also, not only in a wheel driving device of a vehicle but also in a transport apparatus such as an aircraft and a ship, it can be used as a propeller driving device, a screw driving device, or the like.

Further, in the embodiments described above, a planetary gear mechanism is used as a transmission, but a gear-type speed change mechanism (for example, a bevel-gear-type differential mechanism) other than a planetary gear mechanism or a speed change mechanism not using a gear may be used.

DESCRIPTION OF REFERENCE NUMERALS AND CHARACTERS 1 to 1F rear-wheel driving device (driving device)
2 electric motor (driving source)
2A first electric motor (left electric motor, driving source)
2B second electric motor (right electric motor, driving source)
11 case
12A first planetary-gear-type speed reducer (first transmission, left transmission)
12B second planetary-gear-type speed reducer (second transmission, right transmission)
21A, 21B sun gear (first rotation element, sun rotating body)
23A, 23B planetary carrier (second rotation element, planetary rotating body)
24A, 24B ring gear (third rotation element, ring rotating body)
36A spline (ring spline portion)
36B spline (ring spline portion)
37A, 37B inward flange portion
43 circlip
51 rotating plate
51b first opposing surface
51c second opposing surface
51d first engagement recess portion
52 first fixing plate
53 second fixing plate
53d second engagement recesses
54 selector plate
55 second engagement piece
56 first engagement piece
58 actuator
60 actuator holding portion
61 oil reservoir
70 connecting spline portion
70A left connecting spline portion
70B right connecting spline portion
71 annular groove
72 through hole
73 gap
74 recessed groove
V vehicle (transport apparatus)
Wr rear wheel (driven portion, wheel)
LWr left rear wheel (left wheel)
RWr right rear wheel (right wheel)
OWC1 first one-way clutch (first one-way power transmission unit)
OWC2 second one-way clutch (second one-way power transmission unit)
SLC switching unit (connection/disconnection unit)

The invention claimed is:

1. A driving device comprising:
a driving source;
a driven portion which is driven by the driving source and propels a transport apparatus;
a first one-way power transmission unit which is provided on a power transmission path between the driving source and the driven portion, which becomes in an engaged state when rotational power in one direction of the driving source side is input to the driven portion side and becomes in a disengaged state when rotational power in the other direction of the driving source side is input to the driven portion side, and which becomes in a disengaged state when rotational power in one direction of the driven portion side is input to the driving source side and becomes in an engaged state when rotational power in the other direction of the driven portion side is input to the driving source side;
a connection/disconnection unit which is provided in parallel with the first one-way power transmission unit on the power transmission path, and which sets the power transmission path to an interrupted state or a connection-permitted state by being activated or deactivated; and
a second one-way power transmission unit which is provided in parallel with the first one-way power transmission unit and in series with the connection/disconnection unit on the power transmission path, which becomes in a disengaged state when rotational power in one direction of the driving source side is input to the driven portion side and becomes in an engaged state when rotational power in the other direction of the driving source side is input to the driven portion side, and which becomes in an engaged state when rotational power in one direction of the driven portion side is input to the driving source side and becomes in a disengaged state when rotational power in the other direction of the driven portion side is input to the driving source side, wherein
the driving source includes a first electric motor driving a left wheel of a vehicle and a second electric motor driving a right wheel of the vehicle,
a first transmission is provided on a power transmission path between the first electric motor and the left wheel,
a second transmission is provided on a power transmission path between the second electric motor and the right wheel,
each of the first and second transmissions is constituted by first to third rotation elements,
the first electric motor is connected to the first rotation element of the first transmission,
the second electric motor is connected to the first rotation element of the second transmission,
the left wheel is connected to the second rotation element of the first transmission,
the right wheel is connected to the second rotation element of the second transmission,
the third rotation element of the first transmission and the third rotation element of the second transmission are connected to each other, and
the first one-way power transmission unit, the connection/disconnection unit, and the second one-way power transmission unit are arranged in the third rotation elements connected to each other.

2. The driving device according to claim 1, wherein
the first electric motor and the first transmission are arranged in this order from a left outer side in a vehicle width direction,
the second electric motor and the second transmission are arranged in this order from a right outer side in the vehicle width direction, and
the first one-way power transmission unit, the connection/disconnection unit, and the second one-way power transmission unit are arranged between the first transmission and the second transmission in the vehicle width direction.

3. The driving device according to claim 1, wherein
the first one-way power transmission unit, the connection/disconnection unit, and the second one-way power transmission unit are arranged further on an inner side than outermost diameter portions of the first transmission and the second transmission in a radial direction.

4. The driving device according to claim 1, wherein
the first electric motor and the first transmission are arranged in this order from a left outer side in a vehicle width direction,
the second electric motor and the second transmission are arranged in this order from a right outer side in the vehicle width direction, and
the first one-way power transmission unit, the connection/disconnection unit, and the second one-way power transmission unit are arranged on either one side of the first transmission or the second transmission in the vehicle width direction and on a radially outer side.

5. The driving device according to claim 4, wherein
the driving device includes an actuator for controlling activation or deactivation of the connection/disconnection unit, and
the actuator is arranged on the other side of the first transmission and the second transmission in the vehicle width direction and on the radially outer side.

6. The driving device according to claim 5, wherein
at least a part of the actuator is arranged further on an inner side than an outermost diameter portion of the first transmission or the second transmission in the radial direction.

7. A driving device comprising:
a driving source;
a driven portion which is driven by the driving source and propels a transport apparatus;
a first one-way power transmission unit which is provided on a power transmission path between the driving source and the driven portion, which becomes in an engaged state when rotational power in one direction of the driving source side is input to the driven portion side and becomes in a disengaged state when rotational power in the other direction of the driving source side is input to the driven portion side, and which becomes in a disengaged state when rotational power in one direction of the driven portion side is input to the driving source side and becomes in an engaged state when rotational power in the other direction of the driven portion side is input to the driving source side;
a second one-way power transmission unit which is provided in parallel with the first one-way power transmission unit on the power transmission path, which becomes in a disengaged state when rotational power in one direction of the driving source side is input to the driven portion side and becomes in an engaged state when rotational power in the other direction of the driving source side is input to the driven portion side, and which becomes in an engaged state when rotational power in one direction of the driven portion side is input to the driving source side and becomes in a disengaged state when rotational power in the other direction of the driven portion side is input to the driving source side, and
a switching unit which is provided in parallel with the first one-way power transmission unit and in series with the second one-way power transmission unit on the power transmission path, and which sets the second one-way power transmission unit to an effective state or an ineffective state by being switched between a first state and a second state, wherein
the driving source includes a first electric motor driving a left wheel of a vehicle and a second electric motor driving a right wheel of the vehicle,
a first transmission is provided on a power transmission path between the first electric motor and the left wheel,
a second transmission is provided on a power transmission path between the second electric motor and the right wheel,
each of the first and second transmissions is constituted by first to third rotation elements,
the first electric motor is connected to the first rotation element of the first transmission,
the second electric motor is connected to the first rotation element of the second transmission,
the left wheel is connected to the second rotation element of the first transmission,
the right wheel is connected to the second rotation element of the second transmission,
the third rotation element of the first transmission and the third rotation element of the second transmission are connected to each other, and
the first one-way power transmission unit, the second one-way power transmission unit, and the switching unit are arranged in the third rotation elements connected to each other.

8. The driving device according to claim 7, wherein
the first electric motor and the first transmission are arranged in this order from a left outer side in a vehicle width direction,
the second electric motor and the second transmission are arranged in this order from a right outer side in the vehicle width direction, and
the first one-way power transmission unit, the second one-way power transmission unit, and the switching unit are arranged between the first transmission and the second transmission in the vehicle width direction.

9. The driving device according to claim 8, wherein
the first one-way power transmission unit, the second one-way power transmission unit, and the switching unit are arranged further on an inner side than outermost diameter portions of the first transmission and the second transmission in a radial direction.

10. The driving device according to claim 7, wherein
the first electric motor and the first transmission are arranged in this order from a left outer side in a vehicle width direction,
the second electric motor and the second transmission are arranged in this order from a right outer side in the vehicle width direction, and
the first one-way power transmission unit, the second one-way power transmission unit, and the switching unit are arranged on either one side of the first transmission or the second transmission in the vehicle width direction and on a radially outer side.

11. The driving device according to claim 10, wherein
the driving device includes an actuator for controlling the first state or the second state of the switching unit, and
the actuator is arranged on the other side of the first transmission and the second transmission in the vehicle width direction and on the radially outer side.

12. The driving device according to claim 11, wherein
at least a part of the actuator is arranged further on an inner side than an outermost diameter portion of the first transmission or the second transmission in the radial direction.

13. A driving device which includes a driving source and a wheel driven by the driving source, the driving device comprising:
- a first one-way power transmission unit which is provided on a power transmission path between the driving source and the wheel, which becomes in an engaged state when rotational power in one direction of the driving source side is input to the wheel side and becomes in a disengaged state when rotational power in the other direction of the driving source side is input to the wheel side, and which becomes in a disengaged state when rotational power in one direction of the wheel side is input to the driving source side and becomes in an engaged state when rotational power in the other direction of the wheel side is input to the driving source side;
- a second one-way power transmission unit which is provided in parallel with the first one-way power transmission unit on the power transmission path, which becomes in a disengaged state when rotational power in one direction of the driving source side is input to the wheel side and becomes in an engaged state when rotational power in the other direction of the driving source side is input to the wheel side, and which becomes in an engaged state when rotational power in one direction of the wheel side is input to the driving source side and becomes in a disengaged state when rotational power in the other direction of the wheel side is input to the driving source side; and
- a switching unit which is provided in parallel with the first one-way power transmission unit and in series with the second one-way power transmission unit on the power transmission path, and which sets the second one-way power transmission unit to an effective state or an ineffective state by being switched between a first state and a second state, wherein
the driving source includes a left electric motor driving a left wheel of a vehicle and a right electric motor driving a right wheel of the vehicle,
a left transmission is provided on a power transmission path between the left electric motor and the left wheel,
a right transmission is provided on a power transmission path between the right electric motor and the right wheel,
each of the left transmission and the right transmission has a sun rotating body, a ring rotating body, a planetary rotating body meshing with the sun rotating body and the ring rotating body, and a carrier rotating body which supports the planetary rotating body in a rotatable and revolvable manner,
the left electric motor is connected to the sun rotating body of the left transmission,
the right electric motor is connected to the sun rotating body of the right transmission,
the left wheel is connected to the carrier rotating body of the left transmission,
the right wheel is connected to the carrier rotating body of the right transmission,
the ring rotating body of the left transmission and the ring rotating body of the right transmission are connected to each other,
the first one-way power transmission unit, the second one-way power transmission unit, and the switching unit are arranged in the ring rotating bodies connected to each other,
in the ring rotating body of the left transmission, an inward flange portion extending inward in a radial direction is supported by the carrier rotating body of the left transmission,
in the ring rotating body of the right transmission, an inward flange portion extending inward in the radial direction is supported by the carrier rotating body of the right transmission, and
an abutment position where the ring rotating body of the left transmission and the ring rotating body of the right transmission directly or indirectly abut on each other is located at the substantially same diameter position as a meshing position between the ring rotating body of the left transmission and the planetary rotating body of the left transmission and a meshing position between the ring rotating body of the right transmission and the planetary rotating body of the right transmission.

14. The driving device according to claim 13, wherein
a meshing portion between the ring rotating body of the left transmission and the planetary rotating body of the left transmission is formed such that a force acts on the ring rotating body of the left transmission in a direction approaching the right transmission in an axial direction when rotational power in one direction of the driving source side is input to the wheel side, and
a meshing portion between the ring rotating body of the right transmission and the planetary rotating body of the right transmission is formed such that a force acts on the ring rotating body of the right transmission in a direction approaching the left transmission in the axial direction when rotational power in one direction of the driving source side is input to the wheel side.

15. The driving device according to claim 14, wherein
the rotational power in one direction of the driving source side is rotational power at the time of advancing the vehicle.

16. The driving device according to claim 13, wherein
the left electric motor and the left transmission are arranged in this order from a left outer side in a vehicle width direction,
the right electric motor and the right transmission are arranged in this order from a right outer side in the vehicle width direction, and
the first one-way power transmission unit, the second one-way power transmission, and the switching unit are arranged on either one side of the left transmission or the right transmission in the vehicle width direction and on a radially outer side.

17. A driving device which includes a driving source and a wheel driven by the driving source, the driving device comprising:
- a first one-way power transmission unit which is provided on a power transmission path between the driving source and the wheel, which becomes in an engaged state when rotational power in one direction of the driving source side is input to the wheel side and becomes in a disengaged state when rotational power in the other direction of the driving source side is input to the wheel side, and which becomes in a disengaged state when rotational power in one direction of the wheel side is input to the driving source side and becomes in an engaged state when rotational power in the other direction of the wheel side is input to the driving source side;

a second one-way power transmission unit which is provided in parallel with the first one-way power transmission unit on the power transmission path, which becomes in a disengaged state when rotational power in one direction of the driving source side is input to the wheel side and becomes in an engaged state when rotational power in the other direction of the driving source side is input to the wheel side, and which becomes in an engaged state when rotational power in one direction of the wheel side is input to the driving source side and becomes in a disengaged state when rotational power in the other direction of the wheel side is input to the driving source side; and a switching unit which is provided in parallel with the first one-way power transmission unit and in series with the second one-way power transmission unit on the power transmission path and sets the second one-way power transmission unit to an effective state or an ineffective state by being switched between a first state and a second state, wherein the driving source includes a left electric motor driving a left wheel of a vehicle and a right electric motor driving a right wheel of the vehicle, a left transmission is provided on a power transmission path between the left electric motor and the left wheel, a right transmission is provided on a power transmission path between the right electric motor and the right wheel, each of the left transmission and the right transmission has a sun rotating body, a ring rotating body, a planetary rotating body meshing with the sun rotating body and the ring rotating body, and a carrier rotating body which supports the planetary rotating body in a rotatable and revolvable manner, the left electric motor is connected to the sun rotating body of the left transmission, the right electric motor is connected to the sun rotating body of the right transmission, the left wheel is connected to the carrier rotating body of the left transmission, the right wheel is connected to the carrier rotating body of the right transmission, the ring rotating body of the left transmission and the ring rotating body of the right transmission are connected to each other via a connecting member fitted from an outer diameter side, the first one-way power transmission unit, the second one-way power transmission unit, and the switching unit are arranged in the ring rotating bodies connected to each other, an oil reservoir for storing lubricating oil is provided above the connecting member, and the connecting member is provided with a through hole passing through an inner circumferential surface and an outer circumferential surface.

18. The driving device according to claim 17, wherein
a ring spline portion is provided on an outer circumferential surface of the ring rotating body of the left transmission,
a ring spline portion is provided on an outer circumferential surface of the ring rotating body of the right transmission,
in the connecting member, a connecting spline portion fitted to the ring spline portions of the ring rotating bodies of the left transmission and the right transmission is provided on the inner circumferential surface, and
the through hole is disposed between the ring spline portion provided in the ring rotating body of the left transmission and the ring spline portion provided in the ring rotating body of the right transmission.

19. The driving device according to claim 18, wherein
the connecting spline portion has
a left connecting spline portion fitted to the ring spline portion provided in the ring rotating body of the left transmission,
a right connecting spline portion fitted to the ring spline portion provided in the ring rotating body of the right transmission, and
an annular groove accommodating a circlip disposed between the left connecting spline portion and the right connecting spline portion, and
the through hole is provided in the annular groove.

20. The driving device according to claim 19, wherein
a predetermined gap is provided in a radial direction between the circlip and the through hole.

21. The driving device according to claim 19, wherein
a plurality of the through holes are provided in a circumferential direction, and
a recessed groove connecting the plurality of the through holes is provided on the outer circumferential surface of the connecting member.

22. The driving device according to claim 17, wherein
an abutment position where the ring rotating body of the left transmission and the ring rotating body of the right transmission directly or indirectly abut on each other is located at the substantially same diameter position as a meshing position between the ring rotating body of the left transmission and the planetary rotating body of the left transmission and a meshing position between the ring rotating body of the right transmission and the planetary rotating body of the right transmission.

23. The driving device according to claim 17, wherein
the driving device further comprises an actuator for controlling an effective state or an ineffective state of the switching unit,
the first one-way power transmission unit, the switching unit, and the second one-way power transmission unit are arranged on either one side of the ring rotating bodies connected to each other and on an outer diameter side,
the actuator is disposed on the other side of the ring rotating bodies connected to each other and on the outer diameter side, and
the oil reservoir is integrally formed with an actuator holding portion for holding the actuator.

* * * * *